US008131218B2

(12) United States Patent
Kleider et al.

(10) Patent No.: US 8,131,218 B2
(45) Date of Patent: Mar. 6, 2012

(54) METHODS AND APPARATUS FOR WIRELESSLY COMMUNICATING SIGNALS THAT INCLUDE EMBEDDED SYNCHRONIZATION/PILOT SEQUENCES

(75) Inventors: John Eric Kleider, Atlanta, GA (US); Robert John Baxley, Atlanta, GA (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 994 days.

(21) Appl. No.: 12/038,983

(22) Filed: Feb. 28, 2008

(65) Prior Publication Data

US 2009/0011722 A1 Jan. 8, 2009

Related U.S. Application Data

(60) Provisional application No. 60/911,787, filed on Apr. 13, 2007.

(51) Int. Cl.
*H04B 7/00* (2006.01)
*H04J 3/06* (2006.01)
(52) U.S. Cl. ............................ 455/59; 370/350; 370/503
(58) Field of Classification Search .................... 455/59, 455/60, 67.16, 139, 205, 61, 62, 91, 93, 102, 455/103; 370/350, 208–210, 500, 510, 513, 370/514, 503; 375/343, 354, 355, 260, 364–367, 375/145, 146, 149
See application file for complete search history.

(56) References Cited

U.S. PATENT DOCUMENTS 5,867,478 A 2/1999 Baum et al.
(Continued)

OTHER PUBLICATIONS

J. K. Cavers, "An Analysis of Pilot Symbol Assisted Modulation for Rayleigh Fading Channels," IEEE Transactions on Vehicular Technology, vol. 40, No. 4, pp. 686-693, Dec. 1991.

(Continued)

*Primary Examiner* — Eugene Yun
(74) *Attorney, Agent, or Firm* — Ingrassia Fisher & Lorenz, P.C.

(57) ABSTRACT

An embodiment for wirelessly communicating a signal includes a transmitter combining a plurality of phase shifted input data signals with a plurality of synchronization/pilot sequences to produce a plurality of combined signals, performing frequency domain-to-time domain transformations of the combined signals to produce a plurality of candidate signals, determining peak-to-average ratios for at least some of the plurality of candidate signals, identifying a selected signal from the plurality of candidate signals based on the peak-to-average ratios, and transmitting the selected signal over a wireless communication channel. An embodiment further includes a receiver receiving a channel-affected version of the transmitted, selected signal, determining an estimate of a selective mapping index, which identifies the synchronization/pilot sequence from the plurality of synchronization/pilot sequences, applying corrections to the received signal based on estimated channel perturbations to produce an equalized combined signal, and producing an output data symbol from the equalized combined signal.

11 Claims, 8 Drawing Sheets

U.S. PATENT DOCUMENTS

| | | | |
|---|---|---|---|
| 6,314,146 | B1 | 11/2001 | Tellado et al. |
| 6,369,758 | B1 | 4/2002 | Zhang |
| 6,411,610 | B1 | 6/2002 | Li et al. |
| 6,473,467 | B1 | 10/2002 | Wallace et al. |
| 6,487,252 | B1 | 11/2002 | Kleider et al. |
| 6,549,561 | B2 | 4/2003 | Crawford |
| 6,549,583 | B2 | 4/2003 | Crawford |
| 6,567,374 | B1 | 5/2003 | Bohnke et al. |
| 6,628,735 | B1 | 9/2003 | Belotserkovsky et al. |
| 6,633,616 | B2 | 10/2003 | Crawford |
| 6,700,866 | B1 | 3/2004 | Heinonen et al. |
| 6,757,299 | B1 | 6/2004 | Verma |
| 6,853,632 | B1 | 2/2005 | Verma et al. |
| 6,928,062 | B2 | 8/2005 | Krishnan et al. |
| 6,985,535 | B2 | 1/2006 | Park et al. |
| 7,027,464 | B1 | 4/2006 | Nakahara et al. |
| 7,042,857 | B2 | 5/2006 | Krishnan et al. |
| 7,164,649 | B2 | 1/2007 | Walton et al. |
| 7,190,734 | B2 | 3/2007 | Giannakis et al. |
| 7,206,606 | B2 | 4/2007 | Kobayashi et al. |
| 7,233,625 | B2 | 6/2007 | Ma et al. |
| 7,269,430 | B2 | 9/2007 | Moorti et al. |
| 7,289,588 | B2 * | 10/2007 | Suh et al. ............... 375/367 |
| 7,317,750 | B2 | 1/2008 | Shattil |
| 7,324,605 | B2 | 1/2008 | Maltsev et al. |
| 7,359,311 | B1 | 4/2008 | Paranjpe et al. |
| 7,403,570 | B2 | 7/2008 | Ma et al. |
| 7,406,261 | B2 | 7/2008 | Shattil |
| 7,471,728 | B2 * | 12/2008 | Brutel et al. ............ 375/260 |
| 7,590,171 | B2 | 9/2009 | Chang et al. |
| 7,688,907 | B2 | 3/2010 | Dang |
| 7,764,593 | B2 * | 7/2010 | Kim et al. ............... 370/208 |
| 7,881,181 | B2 * | 2/2011 | Dapper et al. ............ 370/206 |
| 2005/0043052 | A1 | 2/2005 | Whinnett et al. |
| 2005/0105505 | A1 | 5/2005 | Fishler et al. |
| 2005/0135503 | A1 | 6/2005 | Talwar et al. |
| 2005/0157814 | A1 | 7/2005 | Cova et al. |
| 2006/0018250 | A1 | 1/2006 | Gu et al. |
| 2006/0239233 | A1 | 10/2006 | Hanada et al. |
| 2006/0250936 | A1 | 11/2006 | Chen et al. |
| 2006/0291431 | A1 | 12/2006 | Pajukoski et al. |
| 2007/0089015 | A1 | 4/2007 | Saul |
| 2007/0098100 | A1 * | 5/2007 | Charbit et al. ............ 375/260 |
| 2007/0211835 | A1 * | 9/2007 | Inagawa et al. ........... 375/343 |
| 2007/0253472 | A1 * | 11/2007 | Jang ..................... 375/150 |
| 2008/0075195 | A1 | 3/2008 | Pajukoski et al. |
| 2008/0095263 | A1 | 4/2008 | Xu et al. |
| 2008/0117995 | A1 | 5/2008 | Anderson et al. |
| 2009/0003308 | A1 | 1/2009 | Baxley et al. |
| 2009/0052561 | A1 | 2/2009 | Baxley et al. |
| 2010/0002784 | A1 | 1/2010 | Hlinka et al. |
| 2010/0029310 | A1 | 2/2010 | Li et al. |
| 2010/0195609 | A1 | 8/2010 | Li et al. |

OTHER PUBLICATIONS

"IEEE Standard Local and Metropolitan Area Network," IEEE Std. 802.16a, Jan. 2003.

R. Negi et al., "Pilot Tone Selection for Channel Estimation in a Mobile OFDM System," IEEE Transactions on Consumer Electronics, vol. 44, pp. 1122-1128, Aug. 1998.

J. E. Kleider et al., "Preamble and Embedded Synchronization for RF Carrier Frequency-Hopped OFDM," IEEE Journal on Selected Areas in Communications, vol. 23, No. 5, pp. 920-931, May 2005.

J. Tellado, "Peak to Average Power Reduction for Multicarrier Modulation," Dissertation submitted to the Dept. Of Electrical Engineering, Sep. 1999.

R. W. Bauml et al., "Reducing the Peak-to-Average Power Ratio of Multicarrier Modulation by Selected Mapping," Electronics Letters, vol. 32, pp. 2056-2057, Oct. 1996.

S. O'Hara, B. Chen et al., "A Bandwidth Efficient Peak Power Reduction Scheme for Multicarrier Modulation Using Selected Mapping," Proc. Conference on Information Sciences and Systems, Mar. 2003.

R. J. Baxley et al., "Magnitude-Scaled Selected Mapping: A Crest Factor Reduction Scheme for OFDM Without Side-Information Transmission," Proc. IEEE Intl. Conference on Acoustics, Speech, and Signal Processing, Apr. 2007.

A. D. S. Jayalath et al., "SLM and PTS Peak-Power Reduction of OFDM Signals Without Side Information," IEEE Transactions on Wireless Communications, vol. 4, pp. 2006-2013, Sep. 2005.

R. J. Baxley et al., "Map Metric for Blind Phase Sequence Detection in Selected Mapping," IEEE Transactions on Broadcasting, vol. 51, pp. 565-570, Dec. 2005.

N. Chen et al., "Peak-to-Average Power Ratio Reduction in OFDM with Blind Selected Pilot Tone Modulation," IEEE Transactions on Wireless Communications, vol. 5, pp. 2210-2216, Aug. 2006.

F. Tufvesson et al., "Time and Frequency Synchronization for OFDM Using PN-Sequence Preambles," Proc. IEEE Vehicular Technology Conference, (Amsterdam, Netherlands), pp. 2203-2207, Sep. 1999.

N. Chen et al., "Superimposed Training for OFDM: A Peak-to-Average Power Ratio Analysis," IEEE Transactions on Signal Processing, vol. 54, pp. 2277-2287, Jun. 2006.

R. J. Baxley et al., "Embedded Synchronization/Pilot Sequence Creation Using POCS," Proc. IEEE International Conference on Acoustics, Speech and Signal Processing, 2006., pp. 321-324, May 2006.

R. J. Baxley et al., "Pilot Design for IEEE 802.16 OFDM and OFDMA," in Proc. IEEE International Conference on Acoustics, Speech and Signal Processing, Apr. 2007.

Z. Wang et al., "Wireless Multicarrier Communications," IEEE Signal Processing Magazine, vol. 17, pp. 29-48, May 2000.

X. Cai et al., "Error Probability Minimizing Pilots for OFDM with m-PSK Modulation Over Rayleigh-Fading Channels," IEEE Transactions on Vehicular Technology, vol. 53, pp. 146-155, Jan. 2004.

E. Larsson et al., "Preamble Design for Multiple-Antenna OFDM-Based WLANs with Null Subcarriers," IEEE Signal Processing Letters, vol. 8, pp. 285-288, Nov. 2001.

M. Dong et al., "Optimal Pilot Placement for Channel Tracking in OFDM," Proc. Military Communications Conference 2002, pp. 602-606, Nov. 2002.

M. Dong et al., "Optimal Design and Placement of Pilot Symbols for Channel Estimation," IEEE Transactions on Signal Processing, vol. 50, No. 12, pp. 3055-3069, Dec. 2002.

L. Tong et al., "Pilot-Assisted Wireless Transmissions: General Model, Design Criteria, and Signal Processing," IEEE Signal Processing Magazine, vol. 21, pp. 12-25, Nov. 2004.

X. Cai et al., "Adaptive PSAM Accounting for Channel Estimation and Prediction Errors," IEEE Transactions on Wireless Communications, vol. 4, pp. 246-256, Feb. 2005.

J. Diaz et al., "Impact of Imperfect Channel State Information Upon the Outage Capacity of Rayleigh Fading Channels," Proc. IEEE Global Telecommunications Conference, 2004, pp. 887-892, Dec. 2004.

R. You et al., "Diversity Combining with Imperfect Channel Estimation," IEEE Transactions on Communications, vol. 53, pp. 1655-1662, Oct. 2005.

T. Weber et al., "Imperfect Channel-State Information in MIMO Transmission," IEEE Transactions on Communications, vol. 54, pp. 543-552, Mar. 2006.

S. Kay, Fundamentals of Statistical Signal Processing, vol. 1: Estimation Theory. Englewood Cliffs, NJ: Prentice-Hall, pp. 521-523, Jan. 1993.

S. Chennakeshu et al., "Error Rates for Rayleigh Fading Multichannel Reception of MPSK Signals," IEEE Transactions on Communications, vol. 43, pp. 338-346, Feb., Mar., Apr. 1995.

J. Proakis, Digital Communications, New York, NY: McGraw-Hill, p. 817, Jan. 2001.

S. Boyd et al.E, Convex Optimization. Cambridge University Press, Jan. 2004.

"Lagrange Multipliers," http://en.wikipedia.org/wiki/Lagrange_multipliers, retrieved on Jan. 11, 2007.

J. Tellado et al., "PAR Reduction in Multicarrier Transmission Systems," Feb. 1998.

Alamouti, S. "A simple transmit diversity technique for wireless communications," IEEE JSAC, vol. 16, No. 8, Oct. 1998, pp. 1451-1458.

Baxley, R.J., et al. "A method for joint peak-to-average power radio reduction and synchronization in OFDM," accepted MILCOM, Orlando, FL, Oct. 2007.

Baxley, R.J., et al. "Pilot design for OFDM with null edge subcarriers," IEEE Trans. Wireless Commuincations, vol. 8, No. 1, pp. 396-405, Jan. 2009.

Cui, T., et al. "Joint frequency offset and channel estimation for OFDM," in Proc. Globecom, vol. 1, pp. 15-19, Dec. 2006.

Dai, H. "Distributed versus co-located MIMO systems with correlated fading and shadowing," in Proc. of ICASSP, vol. IV, May 2006, pp. 561-564.

Fechtel, S. "OFDM carrier and sampling frequency syncronization and its performance on stationary and mobile channels," IEEE Trans Cons. Elect., vol. 46, No. 3, Aug. 2000.

Gault, S., et al. "Joint sampling clock offset and channel estimation for OFDM Signals: Cramer-Rao bound and algorithms," IEEE Trans. Signal Proc., vol. 54, No. 5, pp. 1875-1885, May 2006.

Ghogho, M., et al. "Semi-blind frequency offset synchronization for OFDM," in Proc. ICASSP, vol. 3, pp. 2333-2336, May 2002.

Goldsmith, A., et al. "Capacity limits of MIMO channels," IEEE, JSAC, vol. 21, No. 5, Jun. 2003, pp. 684-702.

Jayalath, A.D.S., et al. Blind SLM receiver for PAR-reduced OFDM, PRoc. IEEE Vehicular Technology Conference, pp. 219-222, Sep. 2002.

Kleider, J., et al. "Timing synchronization in distributed mobile MISO rayleigh fading channels," in Proc. MILCOM, pp. 1-7, Oct. 2007.

Kleider, J., et al. "MISO joint synchronization-pilot design for OFDM systems," in Proc. ICASSP, pp. 3033-3036, Mar.-Apr. 2008.

Le, H.N., et al. "Joint channel estimation and synchronization for MIMO-OFDM in the presence of carrier and sampling frequency offsets," IEEE Trans. on Vehicular Technology, vol. 58, No. 6, Jul. 2009.

Li, X. "Space0time coded multi-transmission among distributed transmitters without perfect synchronization," IEEE Signal Processing Letters, vol. 11, No. 12, Dec. 2004, 948-951.

Lu, B., et al. "Iterative receivers for space-time block-coded OFDM systems in dispersive fading channels," IEEE Trans. On Commun., vol. 53, No. 1, pp. 162-172, Jan. 2005.

Ma, X., et al. "Joint frequency offset and channel estimation for OFDM," in Proc. Globecom, vol. 1, pp. 15-19, Dec. 2006.

Ma, X., et al. "Hopping pilots for estimation of frequency offset and multiantenna channels in MIMO-OFDM," IEEE Trans. On Commun., vol. 1, No. 2, pp. 213-225, Apr. 2002.

Ma, Q., et al. "Differential space-time-frequency coded OFDM with maximum multipath diversity," IEEE Trans. Wireless Commun., vol. 4, No. 5, pp. 2232-2243, Sep. 2005.

Ohno, S. "Preamble and pilot symbol design for channel estimation in FDM," in Proc. ICASSP, vol. 3, pp. 281-284, Apr. 2007.

Pun, M.O., et al. "Iterative detection and frequcny synchronization for OFDMA uplink transmissions," in IEEE Trans. Wireless Commun., Feb. 2007.

Schmidl, T.M., et al. "Robust frequency and timing synchronization for ODFM," IEEE Trans on Commun., vol. 45, No. 12, pp. 1613-1621, Dec. 1997.

van Zelst, A., et al. "Implementation of a MIMO-OFDM-based wireless LAN system," IEEE Trans. Signal PRoc., vol. 52, No. 2, pp. 483-494, Feb. 2004.

U.S. Office Action for U.S. Appl. No. 12/051,535 mailed Mar. 15, 2011.

U.S. Office Action for U.S. Appl. No. 12/102,677 mailed Feb. 2, 2011.

M. Morelli et al., "A Comparison of Pilot-Aided Channel Estimation Methods for OFDM Systems," IEEE Trans. on Signaling Processing, vol. 49, No. 12, pp. 3065-3073, Dec. 2001.

Anderson, K., et al. "Two dimensional diversity enhancement for tactical wireless networks using multi-carrier cooperative networking," in proceedings of SDR Forum Technical Conference Nov. 13-17, 2006.

Cao, Z., et al. "Frequency synchronization fro generalized OFDMA uplink," in Proc. IEEE Globecomm, Nov. 2004.

Choi, J., et al. "Carrier frequency offset compensation for uplink of OFDM-FDMA systems," IEEE Communications Letters, Dec. 2000.

Giannakis, G., et al. Space-Time Coding for Broadband Wireless Communications, John Wiley and Sons, Hoboken, NJ, Jan. 2007. www.researchandmarkets.com/reports/449857.

Huang, D., et al. "An Interference cancellation scheme for carrier frequency offsets correction in OFDMA systems," IEEE Trans. Commun., Jul. 2005.

Tonello, A. "Multiuser detection and turbo multiuser decoding for asynchronous multitone multiple access," in Proc. IEEE Veh. Techn. Conf., Sep. 2002.

Final Office Action issued Jul. 15, 2011 in U.S. Appl. No. 12/102,677.

* cited by examiner

METHODS AND APPARATUS FOR WIRELESSLY COMMUNICATING SIGNALS THAT INCLUDE EMBEDDED SYNCHRONIZATION/PILOT SEQUENCES

CROSS-REFERENCE TO RELATED APPLICATION

This application claims the benefit of U.S. Provisional Application No. 60/911,787, filed Apr. 13, 2007.

GOVERNMENT LICENSE RIGHTS

The U.S. Government may have certain rights to some or all of the inventive subject matter of the present application as provided for by the terms of contract No. DAAD19-01-2-0011 awarded by Army Research Laboratory.

TECHNICAL FIELD

The inventive subject matter generally relates to methods and apparatus for wirelessly communicating signals, and more particularly to methods and apparatus for wirelessly communicating signals that include embedded synchronization/pilot sequences in multi-carrier communication systems.

BACKGROUND

In multi-carrier communication systems, orthogonal frequency division multiplexing (OFDM) is an effective, high-speed communications technique that allows for relatively efficient multi-path channel equalization. However, signals generated using traditional OFDM techniques tend to suffer from relatively large peak-to-average ratios (PARs) or peak-to-average power ratios (PAPRs), which in turn may lead to significant distortion noise and low power efficiency in peak-limited channels. In addition, under relatively harsh channel conditions, transmitted OFDM signals tend to incur significant timing offsets and carrier frequency offsets. Because traditional OFDM techniques tend not to be robust under harsh channel conditions, significant timing offsets may result in inter-block interference, and significant carrier frequency offsets may result in inter-carrier interference. Both of these forms of interference are detrimental to the bit error rates of received signals.

In order to mitigate these detrimental effects, some traditional OFDM methods include, on the transmitter side, transmitting a synchronization and/or channel estimation preamble in conjunction with and preceding each transmit information sequence. On the receiver side, the preamble is used during signal acquisition to synchronize to the received signal and, when the preamble also includes channel training information, it also may be used to perform channel estimation (e.g., estimating transmission channel parameters such as timing offset, carrier frequency offset, and multi-path fading). Although transmission of a preamble is relatively simple to implement, a tradeoff to implementing this technique is that a significant amount of bandwidth is used solely for preamble transmission, and thus for synchronization, acquisition, and, when channel training information is available, also for channel estimation. Furthermore, using preamble-based techniques, there are no options for re-acquiring a signal during the information sequence reception portion of the transmission if synchronization is lost after the preamble is received.

Another traditional OFDM method excludes the use of a preamble for synchronization, and instead a cyclic prefix (or cyclic extension) is included within each transmitted OFDM symbol. Using a cyclic prefix, the first G samples represented in the OFDM symbol are an exact copy of the last G samples of the inverse fast Fourier transform (IFFT) baseband output. The cyclic prefix can be used for timing and frequency synchronization, but this method is generally less robust than using methods that include transmission of a preamble because G typically is selected to be less than the length of a typical preamble (e.g., a preamble having length L). Comparatively, for example, if $L \approx 10G$, the detection performance (e.g., the detection signal-to-noise ratio (SNR)) should be about 10 dB higher using a preamble of length L compared to a cyclic prefix of length G. Because each OFDM symbol contains a cyclic prefix, a correlation may be performed on each OFDM symbol, and then the correlations may be integrated over multiple symbols (e.g., 10 OFDM symbols) in order to achieve substantially equivalent detection SNR. However, this incurs a processing delay proportional to the number of OFDM symbols over which the correlations are integrated (e.g., a processing delay of 10 OFDM symbols), which is unacceptable in many applications. In addition, a cyclic prefix is not useful for PAR reduction.

In order to mitigate the effects of the channel on a received signal, some traditional OFDM methods also perform channel estimation, on the receiver side. The channel estimate may be used to compensate for clipping associated with a limited channel dynamic range, timing offsets, carrier frequency offsets, and multi-path fading among other things. Naturally, the channel estimate has some error, when compared with actual channel conditions. Traditional OFDM transmission methods may experience an increase in channel estimation errors on the receiver side, which may result from non-linear amplification, by a power amplifier device on the transmitter side, of transmit information sequences having higher than desired peak-to-average power ratios. Such non-linear transmission may cause significant out-of-band interference (i.e., interference outside the signal bandwidth, such as in the adjacent channels and/or other user channels), and also may induce undesired in-band interference, which adds distortion the transmitted information bits and also to the channel training information. Furthermore, improper synthesis of the channel training information may lead to further channel estimation errors at the receiver. Thus, non-linear amplification of high peak-to-average power ratio signals and improper channel training information design may, in the receiver, result in unacceptably high channel estimation errors and excessively high bit error rates.

Accordingly, what are needed are methods and apparatus for communicating wireless signals in multi-path communication systems, in which synchronization and acquisition are performed in a bandwidth-efficient manner that is relatively robust under harsh channel conditions. Also needed are methods and apparatus that enable re-acquisition of a signal to be performed if synchronization is lost during the information sequence reception portion of a transmission. Also needed are methods and apparatus for communicating wireless signals having improved peak-to-average power ratios and/or bit error rates, when compared with traditional methods and apparatus. Other features and characteristics of the inventive subject matter will become apparent from the subsequent detailed description and the appended claims, taken in conjunction with the accompanying drawings and this background.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description of the inventive subject matter is merely exemplary in nature and is not intended to limit the inventive subject matter or the application and uses of the inventive subject matter. Furthermore, there is no intention to be bound by any theory presented in the following detailed description.

Embodiments include methods and apparatus for wirelessly communicating orthogonal frequency division multiplexing (OFDM) signals between wireless communication devices. Signals communicated according to various embodiments include embedded synchronization/pilot sequences, as will be described in detail below. The embodiments may have one or more significant advantages over traditional OFDM techniques, in that the embodiments address the issues of signal distortion relating to non-linear amplification of transmit information sequences having higher than desired peak-to-average ratios (PARs), carrier frequency offset sensitivity, and timing synchronization, among other things.

Embodiments may include PAR reduction and embedded synchronization methods and apparatus, and may be referred to herein as synchronization pilot sequence (SPS) selected mapping (SLM), or SPS-SLM. SPS-SLM embodiments described herein simultaneously consider a plurality of channel impairments (e.g., channel perturbations) in an OFDM system, and apply a unified approach for correcting the impairments. By simultaneously addressing multiple channel impairments, according to various embodiments, overhead devoted to channel impairment correction and/or PAR reduction may be reduced when compared with traditional methods that address these issues individually. This may lead to greater bandwidth efficiencies. In addition, the various embodiments may be capable of performing better, in harsh channel environments, than traditional OFDM techniques.

Figure 1:
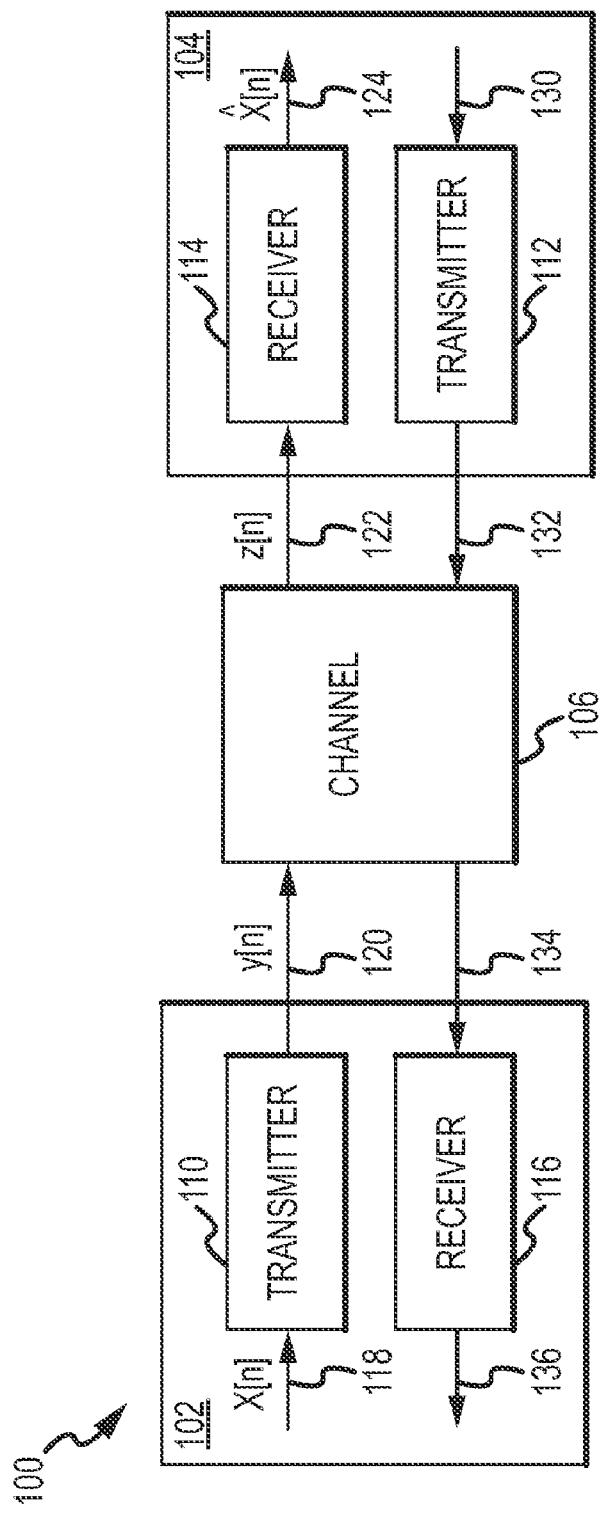
FIG. 1 is a simplified block diagram of a multi-carrier communication system that includes multiple wireless communication devices that communicate over a wireless communication channel, in accordance with an example embodiment.

FIG. 1 is a simplified block diagram of a multi-carrier communication system 100 that includes multiple wireless communication devices 102, 104 that communicate over a wireless communication channel 106, in accordance with an example embodiment. Wireless communication devices 102, 104 may include, for example but not by way of limitation, a device selected from a group of devices comprising a cellular telephone, a radio, a one-way or two-way pager, a personal data assistant, a computer (e.g., a laptop or desktop computer), a base station, an unmanned autonomous vehicle, a wireless transmitter, and/or a wireless transceiver.

Embodiments may be implemented in wireless communication devices 102, 104 that include both a transmitter 110, 112 and a receiver 114, 116 (e.g., each device 102, 104 includes a transceiver). In such embodiments, system 100 may provide for two-way communications between devices 102, 104. For example, transmitter 110 in a first device 102 may receive an input data symbol 118, X[n], and may generate and transmit, over channel 106, a wireless signal 120, y[n], which represents the input data symbol 118. Receiver 114 in a second device 104 may receive a channel-affected version 122, z[n], of the wireless signal 120, and may generate an output data symbol 124, $\hat{X}[n]$, representing an estimate of the input data symbol 118. Additionally, transmitter 112 in the second device 104 may receive another input data symbol 130, and may generate and transmit, over channel 106, a wireless signal 132 representing the input data symbol. Receiver 116 in the first device 102 may receive a channel-affected version 134 of the wireless signal 132, and may generate an output data symbol 136 representing an estimate of the input data symbol 130. In other embodiments, system 100 may provide for one-way communications. For example, one device may include a transmitter (and no receiver) and another device may include a receiver (and no transmitter). In order to more clearly and simply describe the various embodiments, only one-way communications between a transmitter 110 in a first device 102 and a receiver 114 in a second device 104 is described in detail in the remainder of this description. It is to be understood that the various embodiments also apply to two-way communications as well.

Functionality of transmitter 110 and receiver 114, are described only briefly in conjunction with the description of FIG. 1. More detailed descriptions of the details of various transmitter and receiver embodiments are included later, in conjunction with FIGS. 3-6. Briefly, transmitter 110 is adapted to apply multiple phase shifts to an input data symbol 118, and to combine a plurality of synchronization/pilot sequences (SPSs) with the phase shifted input data in order to produce a plurality of candidate signals. First and second scaling factors may be applied to the input data symbol and to the plurality of SPSs, respectively, prior to combining the phase shifted input data and the plurality of SPSs. As will be discussed in detail later, the scaling factors affect the relative signal power allocated to the phase shifted input data and the SPSs with which they are combined. Transmitter 110 also is adapted to determine PARs for at least some of the candidate signals, and to identify a selected candidate signal based on the PARs (e.g., the selected candidate signal may be the candidate signal with the lowest PAR). Transmitter 110 also is adapted to transmit a wireless signal 120 representing the selected candidate signal over the wireless communication channel 106.

Receiver 114 is adapted to receive a channel-affected version 122 of the wireless signal 120 from the wireless communication channel 106. Receiver 114 also is adapted to determine estimated channel perturbations within the channel-affected signal 122 based on its knowledge of the plurality of SPSs, and to apply corrections to the channel-affected signal 122, based on the estimated channel perturbations. Receiver 114 also is adapted to produce the output data symbol 132 based on the corrected signal, which represents an estimate of the input data symbol 130 processed at the transmitter 110.

As alluded to above, a wireless signal transmitted over a channel (e.g., channel 106) may be adversely affected by the channel, and a receiver that receives a channel-affected version of the transmitted signal may attempt to determine and correct for estimated channel perturbations reflected within the channel-affected signal. In fact, the channel perturbations generated by channel 106 may not be the same for signals from transmitter 110 to receiver 114 as compared to a transmission from transmitter 112 to receiver 116. A number of factors may induce differences in the forward and reverse directions. For example, when either or both devices 102, 104 are mobile, channel 106 will be time variant, and the time that transmitter 110 transmits to receiver 114 may be different from the time than transmitter 112 may transmit to receiver 116. Thus, the channel 106 will be different depending on the transmit time for each transmitter 110, 112. Furthermore, the channel 106 itself may have different characteristics in the forward direction as compared to the reverse direction. These differences may be induced by a number of factors which include, for example, device 102 possessing a transmit/receive antenna having different characteristics from the transmit/receive antenna of device 104, and/or the local scattering environment being different for each device 102, 104, among other things. In order better to convey how a receiver may determine and correct for estimated channel perturbations, in accordance with various embodiments, a simplified channel model will now be described.

Figure 2:
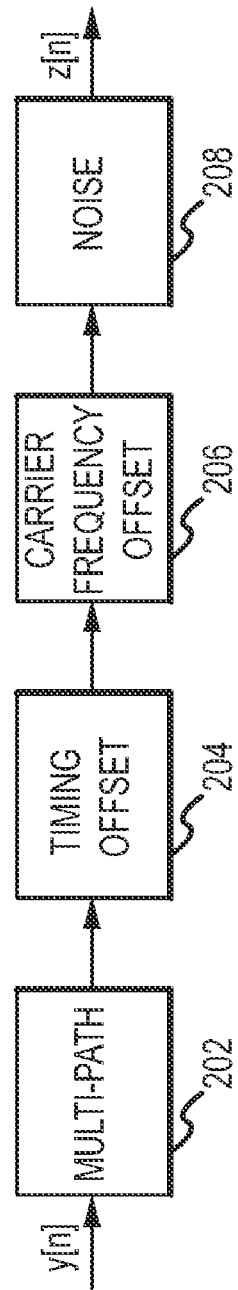
FIG. 2 is a simplified block diagram of a channel model, in accordance with an example embodiment.

FIG. 2 is a simplified block diagram of a channel model 200, in accordance with an example embodiment. In particular, channel model 200 illustrates various channel characteristics that may affect (e.g., perturb) a signal transmitted over the channel, and more particularly an unsynchronized mobile channel that communicates signals generated by a peak power-constrained system. These characteristics include, for example, a multi-path fading component 202 (which, in the frequency domain, manifests itself as frequency selective fading), a timing offset (TO) component 204, a carrier frequency offset (CFO) component 206, and an additive noise component 208. Although not strictly part of the channel model, the input-to-output characteristic of the transmitter's power amplifier (e.g., power amplifier 316, FIG. 3), which may or may not be assumed to be time-invariant, also may affect the characteristics of a transmitted wireless signal. A signal, z[n], to which the channel model 200 and the power amplifier input-to-output characteristic has been applied may be represented, for example, by the equation:

$$z[n] = (f_{PA}(y[n-n_0]) * h[\tau])e^{-j2\pi\epsilon/N} + \eta[n], \quad \text{(Equation 1)}$$

where $f_{PA}(\cdot)$ represents the power amplifier input-to-output characteristic, which may be assumed to be time-invariant, $h[\tau]$ represents multi-path fading component 202, $y[n-n_0]$ represents a transmitted signal, y[n], subjected to a TO component 204, $e^{-j2\pi\epsilon/N}$ represents a CFO component 206, $\eta[n]$ represents an additive noise component 208, and * is the convolution operator.

Figure 3:
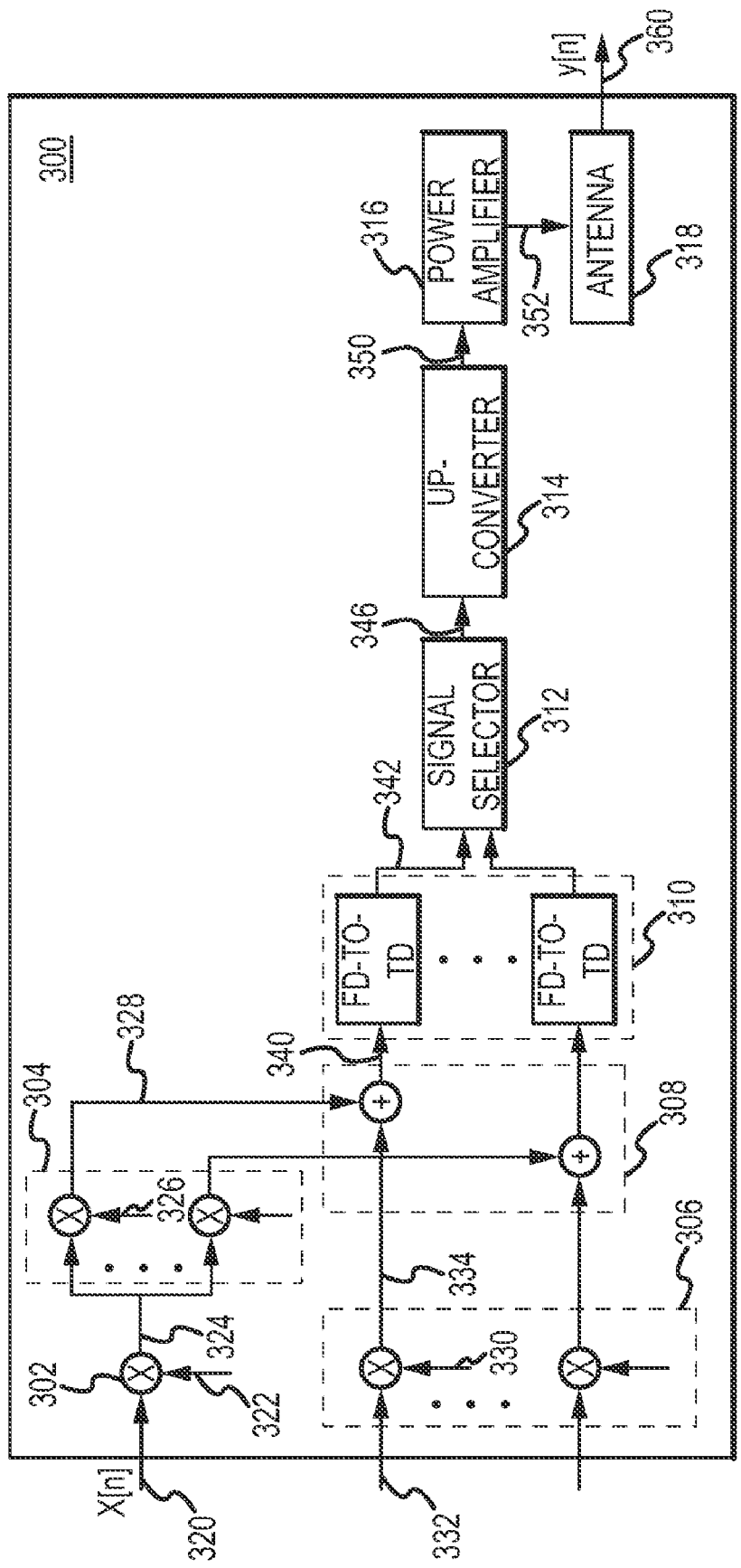
FIG. 3 is a simplified block diagram of a transmitter, in accordance with an example embodiment.

More detailed descriptions of various embodiments of transmitters (e.g., transmitter 110, FIG. 1) and receivers (e.g., receiver 114, FIG. 1) and methods of their operation will now be described. In particular, FIG. 3 is a simplified block diagram of a transmitter 300, in accordance with an example embodiment. Transmitter 300 includes a data/scaling factor combiner 302, a plurality of phase shifters 304, a plurality of SPS/scaling factor combiners 306, a plurality of data/SPS combiners 308, a plurality of frequency domain-to-time domain (FD-to-TD) transformers 310, a signal selector 312, an up-converter 314, a power amplifier 316, and an antenna 318 operatively coupled together as illustrated in FIG. 3, in an embodiment.

Data/scaling factor combiner 302 includes computational apparatus adapted to receive a sequence of input data symbols 320, $X_k$, each of which represents a data-bearing part of a signal to be transmitted. In an embodiment, $X_k$ is drawn from a finite constellation. Data/scaling factor combiner 302 is further adapted to apply a first scaling factor 322 to an input data symbol 320 in order to produce a scaled input data symbol 324. In an embodiment, the first scaling factor 322 has a value of $\sqrt{1-\rho}$, where $\rho$ is an embedding factor having a value between 0 and 1. In a particular embodiment, the embedding factor has a value in a range of about 0.25 to about 0.35. In another embodiment, the embedding factor has a value in a range of about 0.2 to about 0.4. In still other embodiments, the embedding factor may have higher or lower values than the above-given ranges. The scaled input data symbol 342 may be represented as $\sqrt{1-\rho}X_k$.

Each of the plurality of phase shifters 304 includes computational apparatus adapted to apply a different phase shift 326, $e^{j\Phi_k^{(d)}}$ to the scaled input data symbol 324, in order to produce a plurality of phase shifted input data signals 328, $\sqrt{1-\rho}X_k e^{j\Phi_k^{(d)}}$, where D is a value referred to herein as a candidate number quantity, d is an index referred to herein as a relational index, and $d \in \{1, 2, \ldots, D\}$. The candidate number quantity, D, may be selected as any integer number from 1 to 16, in an embodiment, although the candidate number quantity may be a larger number, in other embodiments. In a particular embodiment, the candidate number quantity is selected as an integer number between 3 and 10. In an embodiment, the number of phase shifted input data signals 328 produced equals the candidate number quantity D, although the number of phase shifted input data signals 328 may be different, in other embodiments. The different phase shifts 326 may be represented within entries of a table of phase shift values, in an embodiment, and the relational index, d, may be used an index into the phase shift value table, among other things. Accordingly, the phase shift value table may have D entries, in an embodiment, although the phase shift value table may have more or fewer entries in other embodiments.

Transmitter 300 also is adapted to obtain a plurality of SPS 332, $S_k^{(d)}$, each of which represents a unique synchronization/pilot sequence. In an embodiment, the plurality of SPS 332 may be obtained from a table of SPSs, which is accessible to or stored in transmitter 300, and which includes a set of pre-generated SPSs, each of which may be referenced by a unique index (referred to below as an SLM index). Each SPS 332 in the transmitter's SPS table is represented in the frequency domain, in an embodiment.

SPS/scaling factor combiners 306 include computational apparatus adapted to apply second scaling factors 330 to the plurality of SPS 332 in order to produce a plurality of scaled SPS 334, $\sqrt{\rho}S_k^{(d)}$, where d is the relational index. Similar to its functionality with respect to the phase shift value table, the relational index, d, also may be used an index into the SPS table. When used in this context, the relational index alternatively may be referred to as an SLM index. As with the phase shift value table, the SPS table also may have D entries, although the SPS table may have more or fewer entries in other embodiments. In addition, in an embodiment, the number of scaled SPS 334 produced equals the candidate number quantity D, although the number of SPS 334 may be different, in other embodiments.

In the above-described embodiment, each different phase shift value 326 may be related to a unique SPS 332 via the relational index, d. In alternate embodiments, a particular phase shift value 326 may be related to multiple unique SPS 332, or a particular unique SPS 332 may be related to multiple phase shift values 326 (e.g., by including duplicate values in the phase shift value table or the SPS table, for example).

In an embodiment, the second scaling factor 330 has a value of $\sqrt{\rho}$, where $\rho$ is the same embedding factor as the embedding factor incorporated in the first scaling factor 322. As will be more clearly depicted in conjunction with FIG. 4, later, because the first and second scaling factors 322, 330 have an inverse relationship, the value of the embedding factor, $\rho$, dictates how much relative signal power is allocated to a data-bearing component, $X_k^{(d)}$, of a transmitted signal as opposed to an SPS component, $S_k^{(d)}$, of the transmitted signal.

Phase shifters 304 provide the plurality of phase shifted input data signals 328 to data/SPS combiners 308, and SPS/scaling factor combiners 306 provide the plurality of scaled SPS 334 to data/SPS combiners 308. Each of data/SPS combiners 308 includes computational apparatus adapted to combine one of the plurality of phase shifted input data signals 328 with one of the scaled SPS 334 in order to produce a plurality of combined signals 340, where the plurality of combined signals 340 may be represented in the frequency domain by the equation:

$$Y_k^{(d)} = \sqrt{\rho} S_k^{(d)} + \sqrt{1-\rho} X_k^{(d)} e^{j\phi_k^{(d)}}. \quad \text{(Equation 2)}$$

In an embodiment, the number of combined signals 340 produced equals the candidate number quantity D, although the number of combined signals 340 may be different, in other embodiments.

Data/SPS combiners 308 provide the plurality of combined signals 340 to FD-to-TD transformers 310. FD-to-TD transformers 310 include computational apparatus adapted to perform frequency domain-to-time domain conversions on each of the combined signals 340, in order to produce a plurality of candidate signals 342, $y^{(d)}[n]$. In an embodiment, the number of candidate signals 342 produced equals the candidate number quantity D, although the number of candidate signals 342 may be different, in other embodiments. The frequency domain-to-time domain conversion may include an inverse Fourier transform (IFT) or, more particularly, an inverse discrete Fourier transform (IDFT), in various embodiments, although other types of frequency domain-to-time domain conversions may be performed in other embodiments. Accordingly, in an embodiment, the plurality of candidate signals 342 may be represented as $y^{(d)}[n]=\text{IDFT}\{Y_k^{(d)}\}$ or alternatively by the following:

$$y^{(d)}[n] = \frac{1}{\sqrt{N}} \sum_{k=0}^{N-1} Y_k^{(d)} e^{j2\pi kn/N} \quad \text{(Equation 3)}$$
$$= x^{(d)}[n]\sqrt{(1-\rho)} + s^{(d)}[n]\sqrt{(\rho)}$$

where $x^{(d)}[n]=\text{IDFT}\{X_k e^{j\phi_k^{(d)}}\}$, $s^{(d)}[n]=\text{IDFT}\{S_k^{(d)}\}$, and $n \in \{0, 1, \ldots, N-1\}$. In an embodiment, an efficient algorithm for computing the inverse discrete Fourier transform (IDFT) may be implemented, such as an inverse fast Fourier transform (IFFT), for example.

The above description indicates that, in an embodiment, transmitter 300 includes a number of phase shifters 304, a number of SPS/scaling factor combiners 330, a number of data/SPS combiners 308, and a number of FD-to-TD transformers 310 that is equal to the candidate number quantity, D, and that these transmitter elements are adapted to generate a same number, D, of phase shifted input data signals 328, scaled SPSs 334, combined signals 340, and candidate signals 342, respectively. In other embodiments, transmitter 300 may include more or fewer than the candidate number quantity, D, of phase shifters 304, SPS/scaling factor combiners 330, data/SPS combiners 308, and/or FD-to-TD transformers 310, and/or some or all of these transmitter elements may be adapted to generate more or fewer than the candidate number quantity, D, of phase shifted input data signals 328, scaled SPSs 334, combined signals 340, and/or candidate signals 342, respectively. Although the number of phase shifters 304, SPS/scaling factor combiners 330, data/SPS combiners 308, and/or FD-to-TD transformers 310 may be the same, in an embodiment, in other embodiments, the numbers of these transmitter components 304, 330, 308, 310 and/or signals 328, 334, 340, 342 may be different. For example, but not by way of limitation, data/SPS combiners 308 may combine a same phase shifted input data signal 328 with multiple scaled SPSs 334 or data/SPS combiners 308 may combine a same scaled SPS 334 with multiple phase shifted input data signals 328, in various embodiments. In other embodiments, some signals may be disregarded when, for example, they fail to meet certain criteria and/or threshold levels, which ultimately may result in fewer than the candidate number quantity, D, of candidate signals 342 being provided to signal selector 312. Accordingly, embodiments of the inventive subject matter are not limited to there being a same number, D, of transmitter components 304, 330, 308, 310 and/or signals 328, 334, 340, 342.

FD-to-TD transformers 310 provide the plurality of candidate signals 342 to signal selector 312. In an embodiment, signal selector 312 includes computational apparatus adapted to determine peak-to-average ratios (PARs) for some or all of the candidate signals 342, and based on the PARs, to identify a selected signal 346 from the candidate signals 342.

As used herein, the term peak-to-average ratio (PAR) means a measurement of a waveform that equals the peak amplitude of the waveform divided by the root mean squared (RMS) or time averaged value of the waveform. Although PAR reduction is discussed extensively herein, embodiments also apply to peak-to-average power ratio (PAPR) reduction, and use of the term PAR herein is intended to include at least PAR and PAPR. PAR is a metric that facilitates an assessment of the dynamic range of a signal, and a signal with a low PAR may be preferable, because it may allow the power amplifier 316 to operate at higher power efficiencies without substantial signal distortion. In an embodiment, the PAR for each of the candidate signals 342 may be calculated according to the following equation:

$$PAR\{y^{(d)}[n]\} = \frac{\max_n |y^{(d)}[n]|^2}{E[|y^{(d)}[n]|^2]}. \quad \text{(Equation 4)}$$

In an embodiment, signal selector 312 performs a next step of a selected mapping (SLM) process, which is a PAR reduction tool that may reduce the PAR of OFDM symbols by multiple decibels (dBs). In a particular embodiment, signal selector 312 is adapted to identify the selected signal 346 as the candidate signal 342 with the lowest PAR. A selected mapping (SLM) index, $\tilde{d}$, of the candidate signal 342 with the lowest PAR may be determined, in an embodiment, according to the following equation:

$$\tilde{d} = \min_{d} PAR\{y^d[n]\}. \quad \text{(Equation 5)}$$

In accordance with an embodiment, PAR reduction is achieved by using D candidate signals 342, and selecting the candidate signal 342 with the lowest PAR. In another embodiment, additional PAR reduction also may be achieved based on the design of the SPSs 330. More particularly, when IDFT$\{S_k^{(d)}\}=s^{(d)}[n]$ has low PAR, the combined sequence of $y^{(d)}[n]=x^{(d)}[n]\sqrt{(1-\rho)}+s^{(d)}[n]\sqrt{(\rho)}$ may, on average, have a lower PAR than $x^{(d)}[n]$. The extent of PAR reduction is related to the magnitude of the embedding factor, $\rho$. When the embedding factor is increased, PAR reductions also are increased. In an embodiment, the SPSs 330 are designed to have a relatively low PAR (e.g., PAR<0.5 dB). In a particular embodiment, the SPSs 330 are designed with arbitrary power spectral densities (PSD) using a convex optimization technique.

In order for the receiver (e.g., receiver 114, FIG. 1) to recover the input data symbol 320, $X_k$ (e.g., to determine an estimate, $\hat{X}_k$, of the input data symbol), the receiver should have knowledge of or estimate the SLM index, $\tilde{d}$. In an embodiment, the receiver has knowledge of possible values for $S_k^{(d)}$ and $\phi_k^{(d)}$ in the form of one or more tables that are accessible to (e.g., stored at) the receiver (e.g., receiver 114), where those tables correspond to the phase shift value table and the SPS table accessible to the transmitter 300. Accordingly, when the receiver has knowledge of SLM index, $\tilde{d}$, it may recover the input data symbol 320, $X_k$. Embodiments of methods and apparatus for a receiver to obtain knowledge of the SLM index, $\tilde{d}$ (e.g., to recover the SLM index, $\tilde{d}$, or to determine an estimate $\hat{\tilde{d}}$ of the SLM index) will be discussed in more detail below, in conjunction with FIG. 5. Basically, embodiments achieve blind phase sequence detection without time and/or frequency synchronization, and/or a priori knowledge of the channel.

Up-converter 314 receives the selected signal 346, and is adapted to perform a frequency up-conversion and digital-to-analog conversion process on the selected signal 346 in order to convert the selected signal from a baseband or intermediate frequencies (IF) to the radio frequency (RF) band. The analog up-converted signal 350 is then amplified by power amplifier 316 to produce an amplified signal 352. Power amplifier 316 may add non-linear distortion to the amplified signal 352. Accordingly, in an embodiment, transmitter 300 may include a feedback loop adapted to analyze the amplified signal 352 and to apply digital pre-distortion to the input data, although this is outside the scope of the present application and is not depicted in FIG. 3. The amplified signal 352 is converted to an analog RF signal 360 and transmitted over the channel (e.g., channel 106, FIG. 1) by antenna 318. Unlike some traditional techniques, the analog RF signal 360 may be transmitted without a preamble, and the embedded synchronization/pilot sequence information provides a way for a receiver robustly to synchronize with a channel-affected version of the transmitted signal, as will be described in detail in conjunction with FIG. 5.

Figure 4:
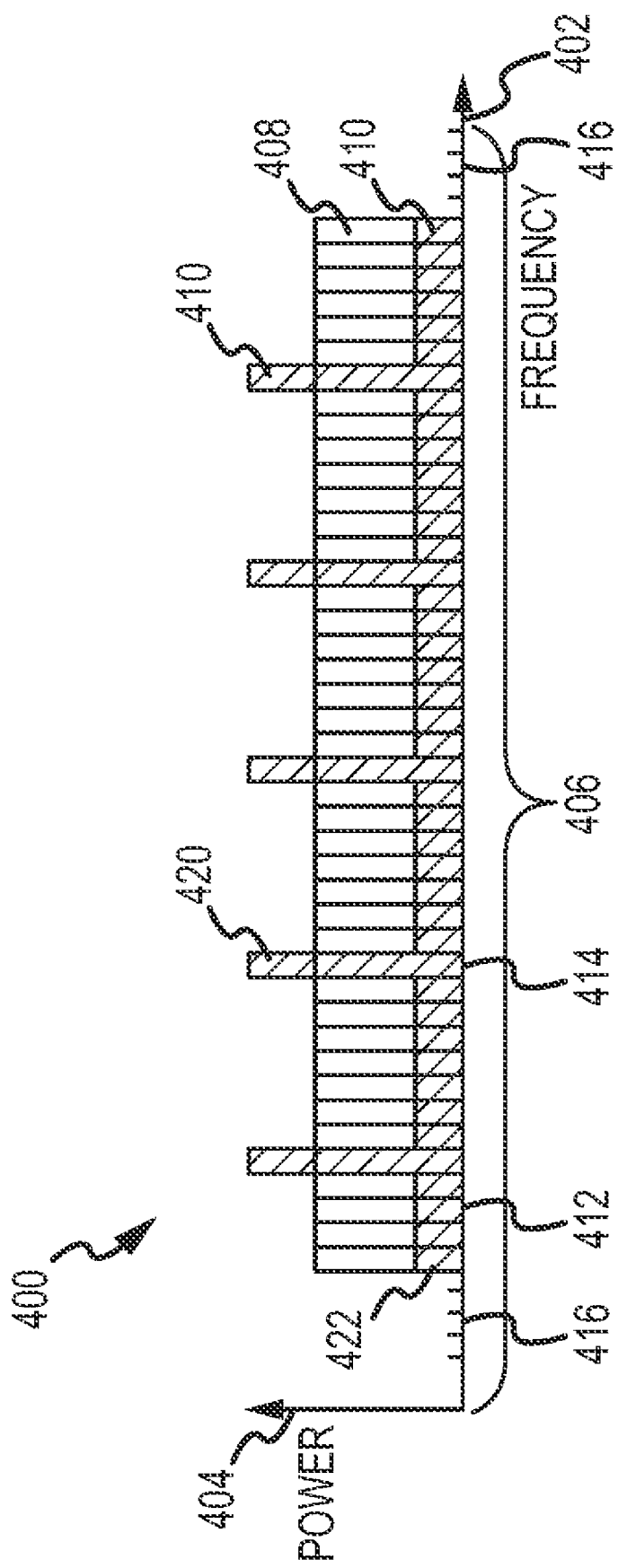
FIG. 4 is an example of a frequency-domain representation of a transmitted signal, in accordance with an example embodiment.

FIG. 4 is an example of a frequency-domain representation of a transmit signal 400, in accordance with an example embodiment. Axis 402 represents frequency, and axis 404 represents signal power (e.g., in dB). Within frequency band 406, the transmit signal 400 includes a data component 408 and an SPS component 410, which are modulated onto a plurality, N, of sub-carriers. More particularly, the subcarriers occupied by the data component 408, $X_k$, of the transmit signal 400, may be decomposed into several non-overlapping parts: 1) data-bearing subcarriers 412, which may be denoted by a set of indices $K_d$; pilot subcarriers 414, which may be denoted by a set of indices $K_p$; and null subcarriers 416, which may be denoted by the set of indices $K_n$. In an embodiment, $X_{k \notin K_d}=0$, so that the data component 408 of the transmit signal 400 only contains energy in data-bearing subcarriers 412. Null subcarriers 416 may be constrained, in an embodiment, to zero to limit the amount of spectral regrowth that may encroach on neighboring channels. Pilot signals 420 may be defined as part of the SPS (e.g., SPS 332, FIG. 3 and SPS 538, FIG. 5). The subcarriers occupied by the SPS component 410 of the transmit signal 400, may be decomposed into the same non-overlapping parts as the data component 408, or more particularly: 1) synchronization subcarriers 412, $K_d$; pilot subcarriers 414, $K_p$; and null subcarriers 416, $K_n$. These signal segmentations may be summarized as Table 1, below:

TABLE 1

|  | $k \in K_d$ | $k \in K_p$ | $k \in K_n$ |
| --- | --- | --- | --- |
| $X_k$ | $\neq 0$ | $=0$ | $=0$ |
| $S_k$ | $\neq 0$ | $\neq 0$ | $=0$ |
| $Y_k$ | $\neq 0$ | $\neq 0$ | $=0$ |

Although fifty-one total sub-carriers (e.g., N=51), thirty-eight data-bearing subcarriers 412, five pilot subcarriers 414, and eight null sub-carriers 416 are illustrated in FIG. 4, these numbers are used for example purposes only, and more or fewer total sub-carriers, data-bearing subcarriers 412, pilot subcarriers 414, and/or null sub-carriers 416 may be utilized, in other embodiments.

SPS component 410 includes synchronization sequence information 422 conveyed within synchronization subcarriers 412 (e.g., data-bearing subcarriers 412), and a plurality of pilot signals 420 conveyed within pilot subcarriers 414, in an embodiment. Because at least some of the synchronization subcarriers 412 occupied by the SPS component 410 are the same as the data-bearing subcarriers 412 occupied by the data component 408, the synchronization sequence information 422 (and thus the SPS component 410) may be considered to be "embedded" within the data component 408.

Pilot signals 420 (or pilot subcarriers 414) have constant power and are evenly spaced (e.g., a same number of data-bearing subcarriers 414 exist between consecutive pilot subcarriers 414), in an embodiment. In alternate embodiments, the positioning and spacing of pilot signals 420 may be different from that illustrated in FIG. 4. In a particular embodiment, the pilot subcarrier 414 spacing is less than the number of null subcarriers (e.g., $N/|K_p|>|K_n|$), which may result in a relatively small channel estimation mean square error (MSE). The amount of power in pilot subcarriers 414 may be quantified according to the equation:

$$\beta = \frac{\sum_{k \in K_p} |S_k|^2}{\sum_{k \in K_p \cup K_d} |S_k|^2}, \quad \text{(Equation 6)}$$

which is the ratio of pilot power to the total SPS power.

Referring also to FIG. 3, in the frequency domain, transmit signal 400 may be represented according to the equation:

$$Y_k = X_k\sqrt{1-\rho} + S_k\sqrt{\rho}, \quad \text{(Equation 7)}$$

where $X_k$ represents and input data symbol 320, $S_k$ represents an SPS 332, $\sqrt{1-\rho}$ represents a first scaling factor 322, and $\sqrt{\rho}$ represents a second scaling factor 330. As mentioned previously, because the first and second scaling factors 322, 330 have an inverse relationship, the value of the embedding factor, $\rho$, dictates how much relative signal power is allocated to the data component 408, $X_k$, of the transmit signal 400 as opposed to the SPS component 410, $S_k$, of the transmit signal 400.

In an embodiment, the embedding factor, $\rho$, has a fixed value, and accordingly the first scaling factor 322 and the second scaling factor 330 also have fixed values. In another embodiment, the transmitter 300 may adjust the value of the embedding factor dynamically. When the embedding factor is increased, the relative power of the SPS component 410 with respect to the data component 408 also will increase. This may be desirable, for example, when the channel is relatively harsh, and increased PAR reductions are desired. However, a tradeoff to increasing the embedding factor (and thus increasing PAR reductions) may be that, as a harsh channel improves (e.g., becomes less harsh), the receiver may have more than enough channel SNR to demodulate, although the received signal SNR may be limited by the distortion induced by the power amplifier 316. In an embodiment, the receiver may feed back information back to the transmitter 300, which indicates the receiver demodulation performance, and thus that the transmitter 300 may increase D and/or $\rho$. Such increases may enable transmitter 300 further to reduce PAR and to minimize the probability of distortion to the transmitted signal that may be induced by the non-linear power amplifier 316. Alternatively, when the embedding factor is decreased, the relative power of the SPS component 410 with respect to the data-bearing component 408 also will decrease. Decreasing the embedding factor may be desirable, for example, when the power amplifier 316 is not inducing significant distortion onto the transmitted signal, and when the demodulation performance of the receiver (e.g., as indicated through feedback from the receiver) is not significantly limited by power amplifier induced distortions and/or by channel multi-path induced distortion, provided that sufficient synchronization performance may still be achieved. However, decreasing the embedding factor may result in smaller PAR reductions. In still another embodiment, the value of the embedding factor may be set to 0, and/or data/scaling factor combiner 302 and SPS/scaling factor combiners 306 may be disabled. In that case, transmit signal 400 will include only a data component 408, as the power of any SPS component 410 effectively will have been reduced to zero. In such an embodiment, a preamble (not illustrated) may be transmitted along with the data in order to facilitate synchronization with the signal at the receiver.

Figure 5:
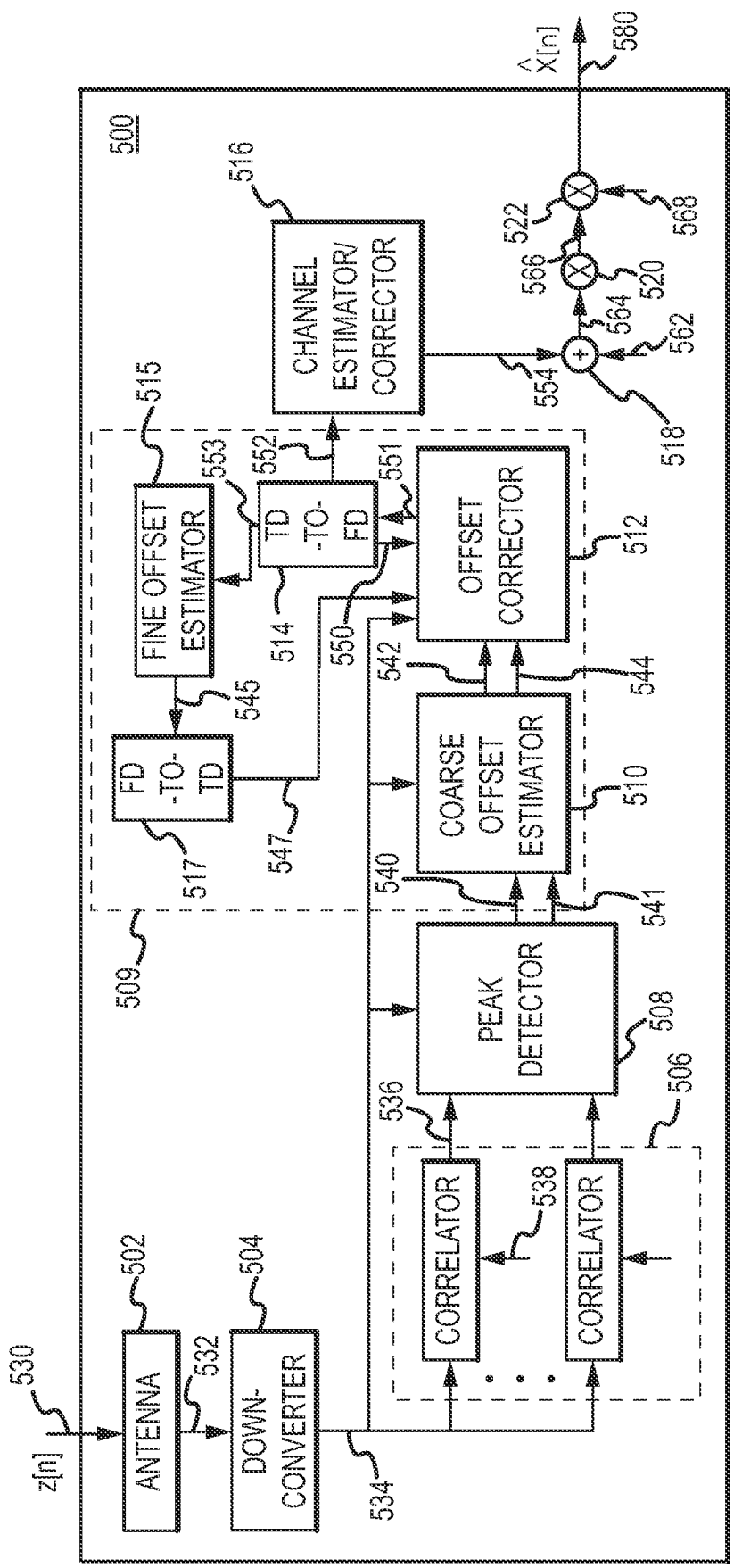
FIG. 5 is a simplified block diagram of a receiver, in accordance with an example embodiment.

FIG. 5 is a simplified block diagram of a receiver 500, in accordance with an example embodiment. Receiver 500 includes an antenna 502, a down-converter 504, a plurality of correlators 506, a peak detector 508, offset estimator/corrector 509, a channel estimator/corrector 516, an SPS removal element 518, scaling element 520, and a phase shift element 522 operatively coupled together as illustrated in FIG. 5, in an embodiment. As will be described in detail below, receiver 500 includes a conjugate correlation receiver, which is adapted to perform a blind phase sequence detection method, in which the receiver 500 may exclude the traditional processes of performing time or frequency synchronization, and in which the receiver 500 may not have a priori knowledge of the channel characteristics.

Antenna 502 is adapted to receive a wireless RF signal 530 from the channel, and to produce an analog RF signal 532. As discussed in detail above, the wireless RF signal 530 represents a channel-affected version of a selected signal that includes a data signal combined with an SPS. Down-converter 532 is adapted to perform an analog-to-digital conversion and a frequency down-conversion process on the analog RF signal 532, in order to produce an IF or baseband received signal 534. Essentially, the received signal 534 represents a channel-affected version of a selected signal (e.g., selected signal 346, FIG. 3) that was transmitted by a transmitter (e.g., transmitter 300, FIG. 3) over a channel. The received signal 534 may be represented by the following equation:

$$z^{(\tilde{d})}[n] = (f_{PA}(y^{(\tilde{d})}[n-n_0]) * h[\tau])e^{-j2\pi\epsilon/N} + \eta[n], \quad \text{(Equation 8)}$$

where $f_{PA}(\cdot)$ represents the power amplifier input-to-output characteristic, which may be assumed to be time-invariant, $h[\tau]$ represents a multi-path fading component of the channel, $y^{(\tilde{d})}[n-n_0]$ represents the transmitted signal, $y^{(\tilde{d})}[n]$, subjected to a TO component, $e^{-j2\pi\epsilon/N}$ represents a CFO component, $\eta[n]$ represents an additive noise component, * is the convolution operator, and $\tilde{d}$ is the SLM index. It is to be noted that any carrier phase shift present between the transmitter and receiver is assumed to be included in the phase of the channel at the receiver.

As will be described in detail below, transmitter 500 is adapted to determine estimated channel perturbations (e.g., multi-path fading, TO, CFO, and/or other signal perturbations) reflected within the received signal 534, to apply corrections to the received signal 534 based on the estimated channel perturbations, and to produce an output data symbol 580 based on the corrected received signal, where the output data symbol 580 represents an estimate of the input data symbol (e.g., input data symbol 320, FIG. 3) that was processed and transmitted by the transmitter.

In an embodiment, estimated channel perturbations are determined by the plurality of correlators 506, the peak detector 508, the offset estimator/corrector 509, and the channel estimator/corrector 516. The plurality of correlators 506 includes computational apparatus adapted to receive the received signal 534, to obtain a plurality of candidate synchronization sequences 538, and to produce a plurality of conjugate correlation (CC) outputs 536, $r^{(\tilde{d})}[u]$. More particularly, each correlator 506 is adapted to correlate the received signal 534 with a different candidate synchronization sequence 538, $s^{(\tilde{d})}[n]$.

In an embodiment, the candidate synchronization sequences 538 include time-domain versions of the same synchronization/pilot sequences (e.g., SPSs 332, FIG. 3) as were combined by the transmitter (e.g., transmitter 300, FIG. 3) with the phase shifted input data (e.g., phase shifted input data 328, FIG. 3). As mentioned previously, both the transmitter (e.g., transmitter 300) and the receiver 500 each may have knowledge of the candidate SPSs by each having access to substantively identical tables of SPSs, although the transmitter's SPS table may include SPSs represented in the frequency domain, and the receiver's SPS table may include the same SPSs represented in the time domain, in an embodiment.

The plurality of conjugate correlation outputs 536 may be represented by the equation:

$$r^{(\tilde{d})}[u] = CC\{s^{(\tilde{d})}[n], z^{(\tilde{d})}[n-u]\}, \quad \text{(Equation 9)}$$

where the conjugate correlation between two length-N sequences may be defined as:

$$CC\{a[n], b[n]\} = \left(\sum_{n=0}^{(N/2)-1} a^*[n]b[n-u]\right) \cdot \left(\sum_{n=N/2}^{N-1} a^*[n]b[n-u]\right)^*. \quad \text{(Equation 10)}$$

In an embodiment, the number of conjugate correlation outputs 536 produced equals the candidate number quantity D, although the number of conjugate correlation outputs 536 may be different, in other embodiments.

In an embodiment, the received signal 534 may be divided into a plurality of subcode sequences in order to reduce the number of operations associated with performing the correlation process. In such an embodiment, each conjugate correlation output 536 may be produced, by generating a sub-correlation for each subcode sequence, and summing together the sub-correlations to form a summed result having a single correlation peak.

Correlators 506 provide the plurality of conjugate correlation outputs 536 to peak detector 508. In an embodiment, correlators 506 may not provide (or peak detector 508 may not evaluate) those of the plurality of conjugate correlation outputs 536 that have correlation peaks below a threshold. Peak detector 508 includes computational apparatus adapted to determine an estimate of the SLM index 540, $\hat{d}$, based on the conjugate correlation outputs 536. In an embodiment, the SLM index estimate 540 is determined according to the equation:

$$\hat{d} = \underset{d}{\operatorname{argmax}} |r^{(d)}[u]|. \quad \text{(Equation 11)}$$

Accordingly, the SLM index estimate 540 corresponds to the conjugate correlation output 536 that represents a highest correlation peak. Unlike traditional methods, embodiments include blind phase sequence detection criterion (e.g., no side information representing the SLM index is transmitted) in order to determine the SLM index estimate 540, and the SLM index estimate 540 is determined based on the conjugate correlations between the received signal 534 and the candidate synchronization sequences 538. Correct detection of $\hat{d}$ may depend on the magnitude of the peaks of $|r^{(d)}[u]|$ for $d \neq \hat{d}$, also referred to herein as "spurious peaks." When the spurious peaks all are less than the peak in $|r^{(\hat{d})}[u]|$, $\hat{d}$ may be correctly detected (e.g., $\hat{d}=\tilde{d}$). In an embodiment, the candidate SPSs 538 are designed so that the spurious peaks are low. In a particular embodiment, the candidate SPSs 538 are designed so that:

$$[\max CC\{s^{(d)}[n], s^{(d)}[n-u]\}] < th_{self}, \quad \text{(Equation 12)}$$

where $th_{self}$ is a threshold that provides adequate system performance. Peak detector 508 provides the SLM index estimate 540, $\hat{d}$, to offset estimator/corrector 509 (or more particularly to coarse offset estimator 510), along with the $\hat{d}$ th conjugate correlation output 541 (although this may be obtained from elsewhere, as well).

Offset estimator/corrector 509 includes a coarse offset estimator 510, an offset corrector 512, a time domain-to-frequency domain (TD-to-FD) transformer 514, a fine offset estimator 515, and a frequency domain-to-time domain (FD-to-TD) transformer 517, in an embodiment. Coarse offset estimator 510 includes computational apparatus adapted to determine a plurality of channel perturbations, including coarse timing offset (TO) estimates 542 and coarse carrier frequency offset (CFO) estimates 544.

In an embodiment, coarse offset estimator 510 is adapted to determine a coarse timing offset estimate 542, $\hat{n}_0$, according to the equation:

$$\hat{n}_0 = \underset{u}{\operatorname{argmax}} |r^{(\hat{d})}[u]|. \quad \text{(Equation 13)}$$

Accordingly, the coarse timing offset estimate 542 is determined based on the maximum of the $\hat{d}$ th conjugate correlation output. Assuming that $\hat{d}=\tilde{d}$, the coarse timing offset estimate should be determined (or "detected") correctly as long as $|r^{(\tilde{d})}[n_0]| > r^{(\tilde{d})}[n]$ for $n \neq n_0$.

In an embodiment, coarse offset estimator 510 also is adapted to determine a coarse estimate of the carrier frequency offset (CFO) 544, $\hat{\epsilon}$, according to the equation:

$$\hat{\epsilon} = \text{angle}(r^{([\$]\$\char`\^\$\$[\$]\$\char`\^ A\tilde{X}\tilde{d})}[\hat{n}_0]). \quad \text{(Equation 14)}$$

Essentially, the coarse CFO estimate is determined as the phase of the conjugate correlation output 536 that was determined by peak detector 508 to have the highest correlation peak.

In an embodiment, the coarse offset and estimator 510 provides the estimated channel perturbations (e.g., coarse timing offset estimates 542 and coarse CFO estimates 544) to offset corrector 512. Offset corrector 512 includes computational apparatus adapted to receive the received signal 534 and the estimated channel perturbations, and to effectively compensate for those estimated channel perturbations in the received signal 534 by aligning the received signal 534 on a symbol boundary using the coarse timing offset estimate 542 and the coarse CFO estimate 544, which may include removing the cyclic extension from the received signal 534. In an embodiment, offset corrector 512 produces a coarsely-corrected signal 550.

Once the coarse timing and carrier frequency offsets are removed, the coarsely-corrected signal 550 may be converted to the frequency domain by time domain-to-frequency domain (TD-to-FD) transformer 514, which includes computational apparatus adapted to perform a time domain-to-frequency domain transformation on the corrected signal 550, in order to produce a frequency-domain, coarsely-corrected signal 553. The time domain-to-frequency domain conversion may include a Fourier transform (FT) or, more particularly, a fast Fourier transform (FFT), in various embodiments, although other types of time domain-to-frequency domain conversions may be performed in other embodiments.

In an embodiment, fine offset estimation may then be performed using fine offset estimator 515. In an embodiment, fine offset estimator 515 determines a fine CFO estimate, which is applied to the coarsely-corrected signal 550 by offset corrector 512. In an embodiment, fine offset estimator 515 determines a fine CFO estimate, $\hat{\epsilon}$, using the pilot signals (e.g., pilot signals 420, FIG. 4) within the frequency-domain, coarsely-corrected signal 553. In an embodiment, this includes estimating the phase of each pilot signal (e.g., pilot signals 420), and determining the phase change in any particular pilot signal from OFDM symbol to OFDM symbol. Thus, the fine CFO estimate may be determined using the common sub-carrier phase difference between OFDM symbols, which may then be averaged across all pilot sub-carriers to minimize estimation variance.

The frequency domain pilot part of the received signal for two consecutive sets of pilot symbols may be approximated as $Y_{k1}^P = X_{k1}^P H_{k1}^P e^{-j2\pi\epsilon'_1/N}$ and $Y_{k2}^P = X_{ki2}^P H_{k2}^P e^{-j2\pi\epsilon'_2/N}$, respectively. The phases $\phi_{ki1}$ and $\phi_{ki2}$, may be computed as $\angle Y_{k1}^P$ and $\angle Y_{k2}^P$ (where $\angle$ represents the angle), respectively. Then, the fine CFO estimate, may be determined according to the equation:

$$CFO = \frac{1}{2\pi T_s} \sum_{k=0}^{|K_{pi}-1|} (\phi_{k1} - \phi_{k2}). \qquad \text{(Equation 15)}$$

Fine offset estimator 515 may provide the fine CFO estimate to offset corrector 512 via a feedback path (not illustrated). In addition, fine offset estimator 515 provides a feedback version 545 of the frequency-domain, coarsely-corrected signal to offset corrector 512 via frequency domain-to-time domain (FD-to-TD) transformer 517, which transforms the feedback version 545 of the coarsely-corrected signal into the time domain to produce a time-domain, fed back, coarsely-corrected signal 547. In an alternate embodiment, the coarsely-corrected signal 550 is retained in memory, and is not fed back to offset corrector 512. Either way, offset corrector 512 applies the fine CFO estimate to the coarsely-corrected signal (either signal 550 or 547) to reproduce the finely-corrected signal 551. In an alternate embodiment, fine CFO correction may be performed in the frequency domain after fine offset estimator 515, rather than performing the fine CFO correction in the time domain by offset corrector 512.

In a further embodiment, fine offset estimator 515 also may determine a fine timing offset estimate and/or a carrier phase offset estimate. For example, fine offset estimator 515 may determine a fine timing offset estimate based on the phase slope between pilot sub-carriers common to each OFDM symbol, which also can be averaged over all symbols. Fine offset estimator 515 may determine a carrier phase offset estimate from the mean value of the phase slope in each OFDM symbol, in an embodiment.

When a fine timing and/or carrier phase offset are estimated, fine offset estimator 515 provides the fine timing and/or carrier phase offsets to channel estimator/corrector 516, in an embodiment, for correction of the fine timing and/or carrier phase offset in the frequency domain. In an alternate embodiment, fine offset estimator 515 may provide the fine timing and/or carrier phase offsets, if estimated, to offset corrector 512 for correction in the time domain.

Either way, the finely-corrected signal 551 is transformed to the frequency domain by TD-to-FD transformer 514, and the resulting corrected signal 552 is provided to channel estimator/corrector 516. Channel estimator/corrector 516 receives the corrected signal 552, determines a channel estimate, and based on the channel estimate, proceeds to equalize the channel effects in the corrected signal 552 to produce an equalized combined signal 554. Channel estimator/corrector 516 is adapted to determine a channel estimate, $\hat{H}_k$ based on the corrected signal 552. In an embodiment, the channel estimate is determined by generating a first quantity according to the equation:

$$W_k^{(d)} = IDFT\{z^{(d)}[n+\hat{n}_0]\}e^{j2\pi\hat{\epsilon}/N}, \qquad \text{(Equation 16)}$$

which yields $W_k^{(d)} = Y_k^{(d)} H_k + \eta_k + \delta_k + \iota_k$, where $\delta_k$ is the distortion noise caused by the power amplifier (e.g., power amplifier 316, FIG. 3), $\iota_k$ is the inter-carrier interference, and $H_k$ and $\eta_k$ are the IDFTs of h[n] and $\eta$[n], respectively. From $W_k^{(d)}$, channel estimator/corrector 516 may estimate the channel in the pilot subcarriers (e.g., pilot subcarriers 414, FIG. 4) according to the equation:

$$\hat{H}_k = \frac{W_k^{(d)}}{S_k^{(\hat{d})}\sqrt{\rho}}, k \in K_p. \qquad \text{(Equation 17)}$$

In an embodiment, channel estimator/corrector 516 may interpolate the pilot subcarrier channel estimates to the data-bearing subcarriers (e.g., data-bearing subcarriers 412, FIG. 4), $k \in K_d$ so that $\hat{H}_k$ is defined for $k \in K_d \cup K_p$.

In an alternate embodiment, assumptions may be made that all of the synchronization works perfectly (e.g., $\hat{\tilde{d}} = \tilde{d}$, $\hat{n}_0 = n_0$, and $\hat{\epsilon} = \epsilon$) and that no distortion noise is introduced by the transmitter power amplifier (e.g., power amplifier 316, FIG. 3). With those assumptions, the first quantity represented in Equation 16, above, may be simplified to:

$$W_k^{(d)} = Y_k^{(d)} H_k + \eta_k, \qquad \text{(Equation 18)}$$

where $\eta_k \sim CN(0, \sigma_\eta^2)$. Using these assumptions and the first order approximation that $E[|\eta_k|^2|\hat{X}_k|^2 H_k] \approx \sigma^2$ for $k \in K_d$, the symbol estimate MSE may be determined according to the equation:

$$E[|\hat{X}_k - X_k|^2|H_k] \approx \frac{\sigma^2}{|H_k|^2} \cdot \left( \frac{(1-\beta)|K_p|}{\beta(1-\rho)|K_d|} + \frac{|K_p|}{\beta\rho|K_d|} + \frac{1}{1-\rho} \right). \qquad \text{(Equation 19)}$$

As Equation 19 indicates, the MSE is dependent on the ratio of pilot to data subcarriers $$\frac{|K_p|}{|K_d|}.$$

Also, the minimizing the pilot subcarrier power is achieved by setting $\beta=1$ when perfect synchronization is assumed. However, in an embodiment, $\beta$ is selected such that $\beta<1$, in order to achieve desired synchronization performance.

Channel estimator/corrector 516 may then generate an equalized combined signal 554 by equalizing the channel effects based on the channel estimate. After the various offset and channel corrections, the equalized combined signal 554 may be represented as:

$$z^{(d)}[n] = ((f_{PA}(y^{(d)}[n-n_0])*h[\tau])e^{-j2\pi\epsilon/N} + \eta[n])e^{j2\pi\hat{\epsilon}/N}. \qquad \text{(Equation 20)}$$

SPS removal element 518 includes computational apparatus adapted to receive the equalized combined signal 554, and to remove the scaled SPS 562 corresponding to the SLM index estimate 540 from the equalized combined signal 554 (e.g., to combine $-\sqrt{\rho}s_k^{([|\$]\$^{-}\$\$[[\$]\$^{-}A\hat{X}\hat{d})}$ with the equalized combined signal 554) in order to produce an estimated, phase shifted data signal 564. Scaling element 520 is adapted to apply a scaling factor to the estimated, phase shifted data signal 564, in order to produce a scaled, phase shifted data signal 566, which has a peak amplitude approximately equal to that of the original input data, X[n].

Phase shift element 522 includes computational apparatus adapted to phase shift the scaled, phase shifted data signal 566 by a phase shift value 568 corresponding to the SLM index estimate 540 (e.g., to shift the scaled, phase shifted data signal 566 by e–jφ^{([$]$$[$]$ Ã̂kd}). The remaining signal is demodulated in order to produce the output data symbol 580, $\hat{X}_k[n]$. When the SLM index estimate 540 represents a correctly-detected SLM index (e.g., an SLM index corresponding to the selected signal 346, FIG. 3, identified at the transmitter 300), then blind phase sequence detection has been robustly performed by receiver 500, and the output data symbol 580 reflects an accurate estimate of the input data symbol (e.g., input data symbol 320, FIG. 3).

Figure 6:
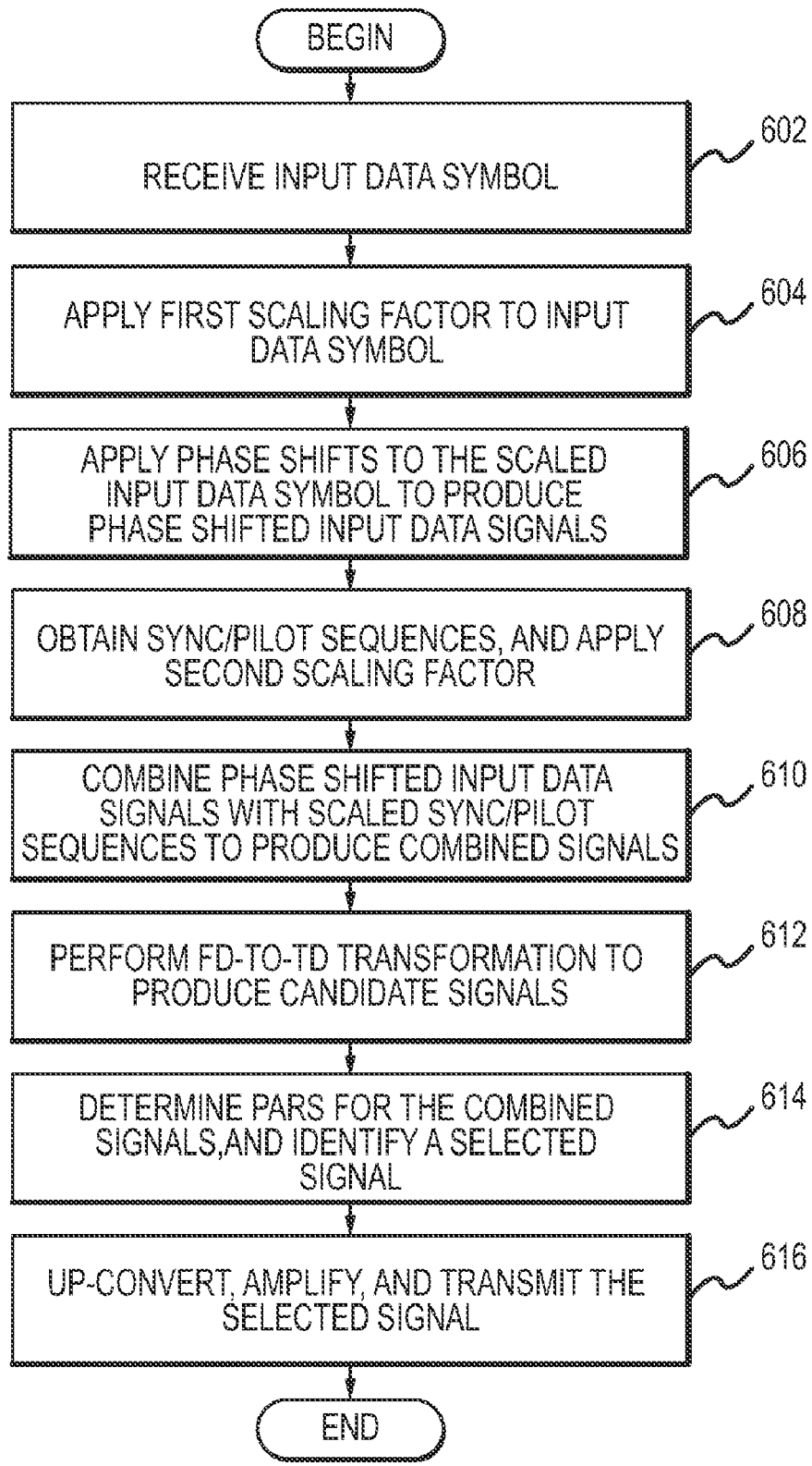
FIG. 6 is a flowchart of a method for generating and transmitting wireless signals that include embedded synchronization/pilot sequences, in accordance with an example embodiment.

FIG. 6 is a flowchart of a method for generating and transmitting wireless signals that include embedded synchronization/pilot sequences, in accordance with an example embodiment. Embodiments of the method are only briefly discussed in conjunction with FIG. 6, as various details and alternate embodiments were discussed in more detail above.

Referring also to FIG. 3, the method may begin, in block 602, when a transmitter (e.g., transmitter 300) receives (e.g., by data/scaling factor combiner 302) an input data symbol (e.g., input data symbol 320). In block 604, a first scaling factor (e.g., first scaling factor 322) may be applied to the input data symbol, in order to produce a scaled input data symbol (e.g., scaled input data symbol 324). As discussed previously, the first scaling factor may have a value of $\sqrt{1-\rho}$, where ρ is an embedding factor having an absolute value between 0 and 1. In other embodiments, the first scaling factor may have a different value. In block 606, various different phase shifts (e.g., phase shifts 326) are applied (e.g., by phase shifters 304) to the scaled input data symbol, in order to produce a plurality of phase shifted input data signals (e.g., phase shifted input data signals 328).

In block 608, a plurality of SPSs (e.g., SPSs 332) are obtained, and a second scaling factor (e.g., second scaling factor 330) is applied to the plurality of SPSs in order to produce a plurality of scaled SPSs (e.g., scaled SPSs 334). As discussed previously, the second scaling factor may have a value of $\sqrt{\rho}$, in an embodiment, although the second scaling factor may have a different value, in other embodiments. Preferably, but not essentially, the second scaling factor has an inverse mathematical relationship with the first scaling factor (e.g., by varying the value of the embedding factor, as the second scaling factor value increases, the first scaling factor value decreases, and vice versa).

In block 610, each one of the plurality of phase shifted input data signals is combined (e.g., by data/SPS combiners 308) with one of the scaled SPSs in order to produce a plurality of combined signals (e.g., combined signals 340). In block 612, a frequency domain-to-time domain conversion is performed (e.g., by FD-to-TD transformers 310) on each of the combined signals, in order to produce a plurality of candidate signals (e.g., candidate signals 342).

In block 614, peak-to-average ratios (PARs) are determined (e.g., by signal selector 312) for some or all of the candidate signals, and based on the peak-to-average ratios, a selected signal (e.g., selected signal 346) is identified from the candidate signals. As discussed previously, the selected signal may be identified as the candidate signal with the lowest PAR, in an embodiment. In block 616, the selected signal is up-converted (e.g., by up-converter 314), amplified (e.g., by power amplifier 316), and transmitted over the channel (e.g., channel 106, FIG. 1). Although not illustrated or discussed herein, those of skill in the art would realize that various other processes for conditioning, filtering, and/or processing the various signals prior to transmission also may be performed at various stages within the process of generating and transmitting the selected signal. Upon transmitting the selected signal, the method may then end.

Figure 7:
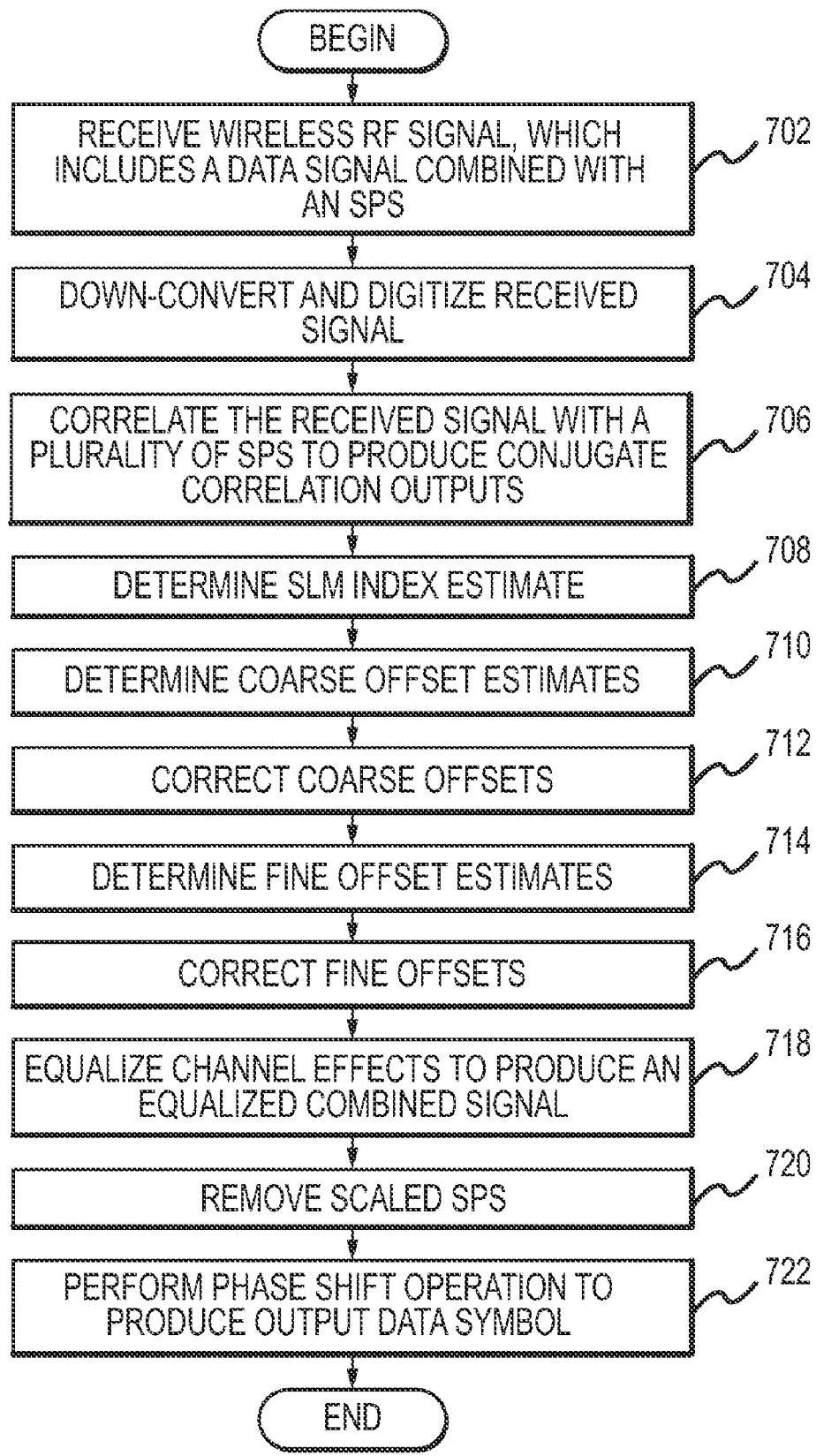
FIG. 7 is a flowchart of a method for receiving and processing wireless signals that include embedded synchronization/pilot sequences, in accordance with an example embodiment.

FIG. 7 is a flowchart of a method for receiving and processing wireless signals that include embedded synchronization/pilot sequences, in accordance with an example embodiment. Embodiments of the method are only briefly discussed in conjunction with FIG. 7, as various details and alternate embodiments were discussed in more detail above.

Referring also to FIG. 5, the method may begin, in block 702, when a receiver (e.g., receiver 500) receives (e.g., via antenna 502) a wireless RF signal (e.g., RF signal 530) from the channel. The received RF signal includes a channel-affected version of a data signal combined with an SPS, as discussed in conjunction with the description of embodiments of the transmitter (e.g., transmitter 300, FIG. 3), and embodiments of the method for generating and transmitting the wireless RF signal (e.g., FIG. 6). In block 704, the received RF signal is down-converted and digitized (e.g., by down-converter 532), in order to produce an IF or baseband received signal (e.g., received signal 534).

In block 706, the received signal is correlated (e.g., by correlators 506) with a plurality of SPSs (e.g., SPSs 538) to produce a plurality of conjugate correlation outputs (e.g., conjugate correlation outputs 536). In block 708, an SLM index estimate (e.g., SLM index estimate 540) is determined (e.g., by peak detector 508), based on the conjugate correlation outputs.

In block 710, coarse offset estimates (e.g., coarse TO and coarse CFO) may be determined (e.g., by coarse offset estimator 510) based on the conjugate correlation output corresponding to the SLM index estimate. In block 712, corrections are made (e.g., by offset corrector 512) for the coarse timing and carrier frequency offsets in the received signal, in order to produce a coarsely-corrected signal (e.g., coarsely-corrected signal 550). In block 714, fine estimated offsets (e.g., fine CFO, fine TO, and/or phase offset) may be determined (e.g., by fine offset estimator 515) based on the coarsely-corrected signal, and in block 716, additional corrections may be made (e.g., by offset corrector 512 in the time domain or by a frequency-domain offset corrector), in order to produce a finely-corrected signal (e.g., finely-corrected signal 551).

In block 718, channel effects are estimated (e.g., by channel estimator/corrector 516) from a frequency-domain version of the finely-corrected signal. The finely-corrected signal is then equalized based on the estimated channel effects, in order to produce an equalized combined signal (e.g., equalized combined signal 554).

In block 720, a scaled SPS (e.g., scaled SPS 562) corresponding to the SLM index estimate is removed (e.g., by SPS removal element 518) from the equalized combined signal, in order to produce an estimated, phase shifted data signal (e.g., estimated, phase shifted data signal 564), which may be scaled (e.g., by scaling element 520). A phase shift operation is performed (e.g., by phase shift element 522), in block 722, which includes phase shifting the scaled, phase shifted data signal by a phase shift value corresponding to the SLM index estimate. This operation results in the production of an output data symbol (e.g., output data symbol 580), which reflects and estimate of the input data symbol (e.g., input data symbol 320, FIG. 3). The method may then end.

Figure 8:
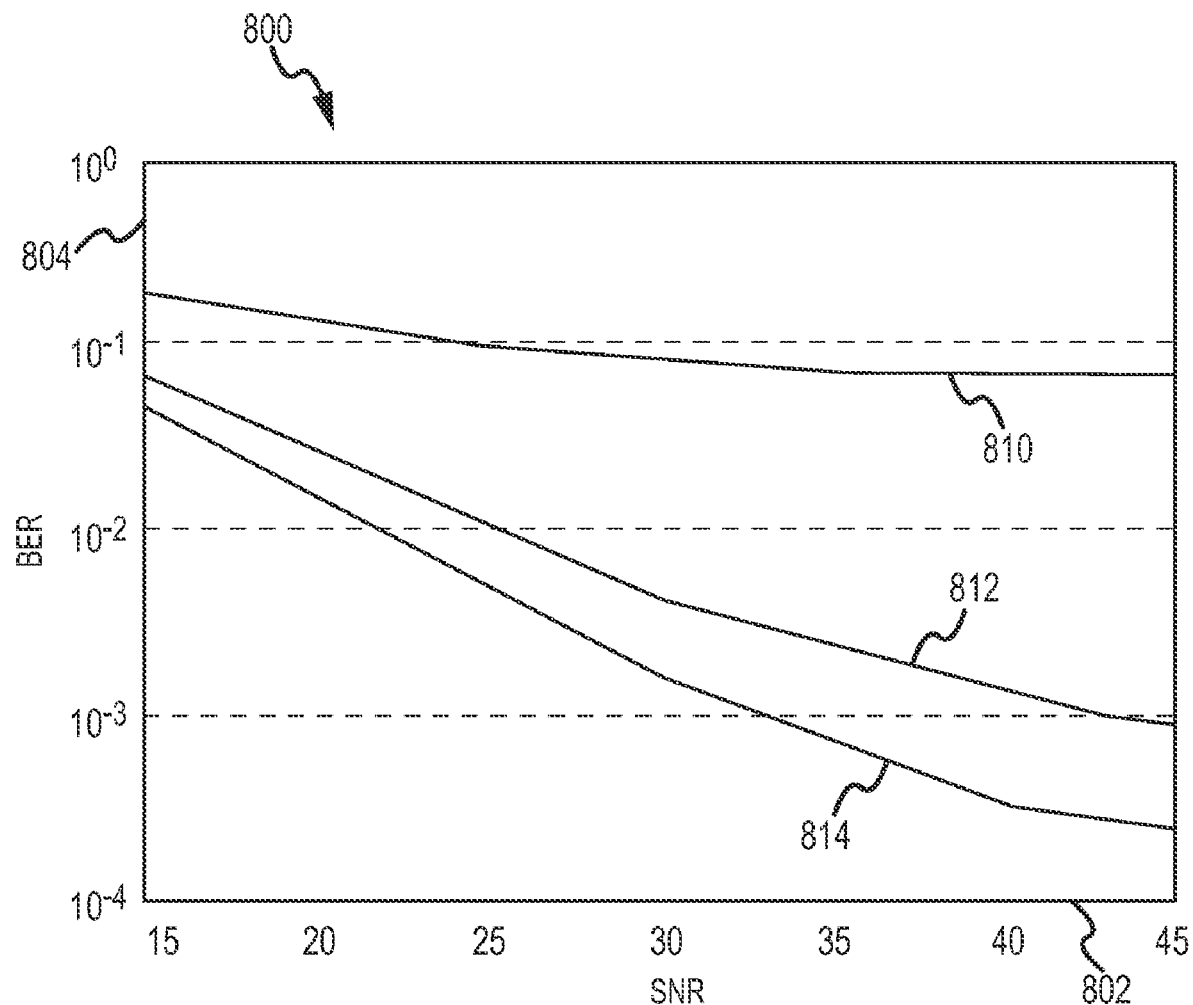
FIG. 8 is a chart plotting bit error rate (BER) performance that may be achieved using two example synchronization/pilot sequence, selective mapping (SPS-SLM) embodiments.
Figure 9:
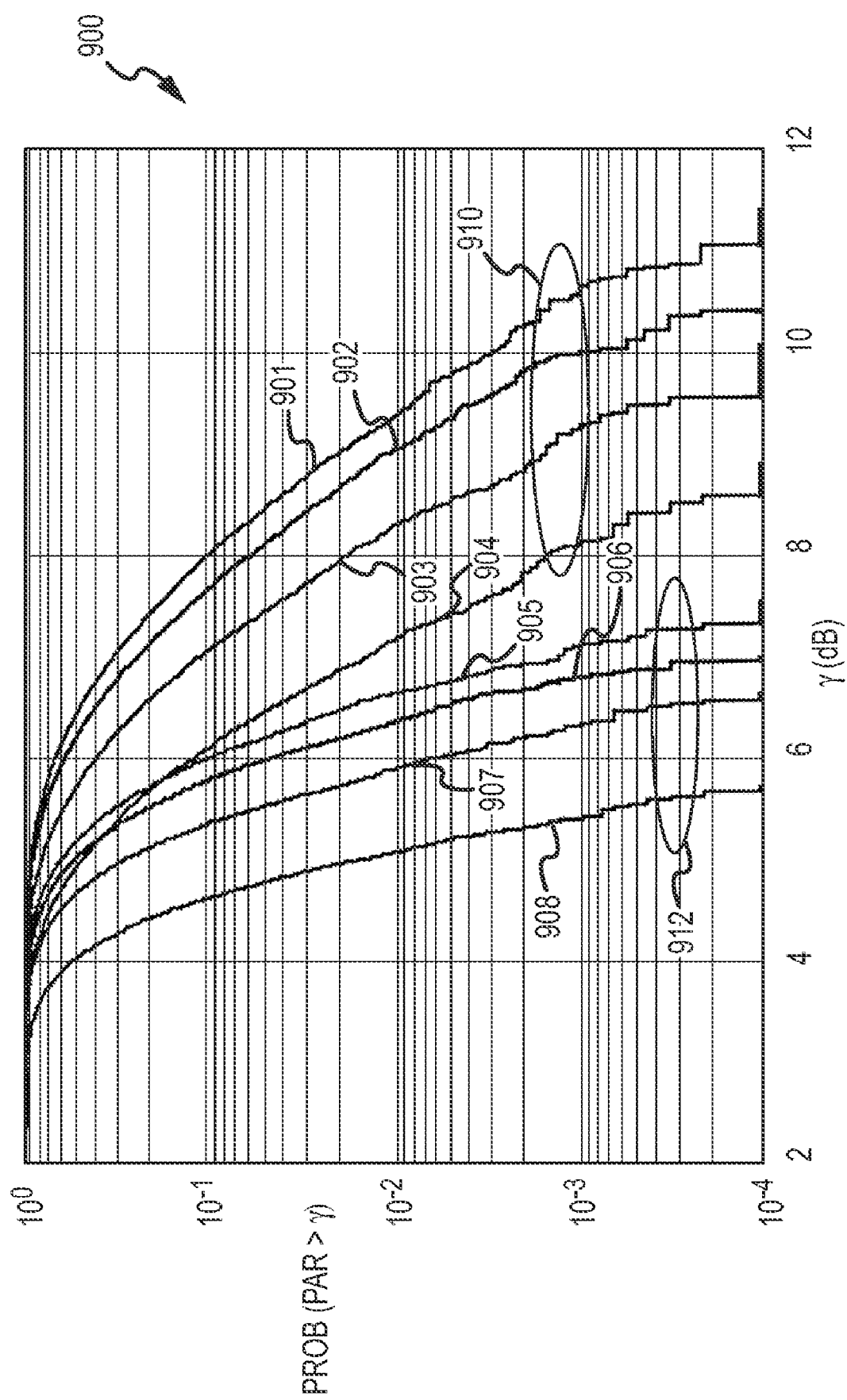
FIG. 9 is a chart comparing peak-to-average ratio (PAR) characteristics for signals produced using various embedding factors and candidate number quantities, in accordance with various example embodiments.

FIGS. 8 and 9 indicate potential simulated results for systems that employ various example embodiments. For example, FIG. 8 is a chart 800 plotting bit error rate (BER)

performance that may be achieved using two example SPS-SLM embodiments. Chart 800 includes a signal-to-noise ratio (SNR) axis 802 and a BER axis 804. The SPSs used to generate plot 800 were generated using a convex optimization technique, according to an embodiment. In addition, an ideal soft limiter channel was used with an input backoff of 3 dB. The CFO was set to a constant ($\epsilon$=0.2, where $\epsilon$ is a function of the subcarrier spacing, $1/T_s$, and number of subcarriers, N, where $T_s$=NT, and T is the baseband sampling period: Thus, an $\epsilon$=0.2 represents a carrier frequency offset of 20% of the subcarrier spacing), the multi-path channel was set to length 16 with an exponential delay spread such that $A\Sigma_{\tau=0}^{14} e^{-\tau}$. Also, N=256, with $|K_p|$=16, $|K_d|$=240, and $|K_n|$=0. The pilot tones were evenly spaced with equal power, and the embedding factor was chosen to be $\rho$=0.35.

Trace 810 plots BER performance for a system in which embedded synchronization was used without any PAR reduction considerations (e.g., the candidate number quantity, D=1, and $S_k^{(1)}$ was generated with a prescribed power profile but random phases). In contrast, trace 812 plots BER performance for a system in which PAR reduction was achieved using SPS designed in accordance with a particular embodiment, and with a candidate number quantity, D=1 (no selective mapping). A comparison between plots 810 and 812 indicates that significantly improved BER performance may be achieved when PAR reduction is used, in accordance with an example embodiment. Trace 814 plots BER performance for a system in which SPS-SLM was used with PAR reduction, in accordance with various embodiments, and with a candidate number quantity, D=8. A further comparison between plots 812 and 814 indicates that even further improved BER performance may be achieved when the candidate number quantity, D, is increased.

FIG. 9 is a chart 900 comparing PAR characteristics for signals produced using various embedding factors, $\rho$, when the candidate number quantity, D, is selected as D=1 (no selective mapping) and D=8, in accordance with various example embodiments. Traces 901, 902, 903, and 904 plot PAR characteristics for D=1 and for embedding factors of $\rho$=0, $\rho$=0.3, $\rho$=0.5, and $\rho$=0.7, respectively. Traces 905, 906, 907, and 908 plot PAR characteristics for D=8 and for embedding factors of $\rho$=0, $\rho$=0.3, $\rho$=0.5, and $\rho$=0.7, respectively. A comparison between the various groups of traces, where group 910 corresponds to D=1 and group 912 corresponds to D=8, and also to the difference between corresponding traces having the same embedding factor value (e.g., traces 904 and 908) indicate that significant PAR reductions may be achieved using SPS-SLM, in accordance with various embodiments.

FIGS. 8 and 9 illustrate that embodiments may provide one or more significant benefits over traditional methods and apparatus. For example, embodiments may provide improved bandwidth efficiency over systems that transmit a preamble for use in synchronization. In addition, use of various embodiments may result in significantly reduced PAR using SPS-SLM. Significant BER improvements also may be possible using SPS-SLM embodiments in harsh channel environments.

Embodiments of methods and apparatus for wirelessly communicating signals that include combined (e.g., embedded) synchronization/pilot sequences have now been described above. The foregoing detailed description is merely exemplary in nature and is not intended to limit the inventive subject matter or the application and uses of the inventive subject matter to the described embodiments. Furthermore, there is no intention to be bound by any theory presented in the preceding background or detailed description.

Those of skill in the art will recognize, based on the description herein, that various other apparatus and processes may be included in embodiments of the systems and methods described herein for conditioning, filtering, amplifying, and/or otherwise processing the various signals. In addition, the sequence of the text in any of the claims does not imply that process steps must be performed in a temporal or logical order according to such sequence unless it is specifically defined by the language of the claim. The process steps may be interchanged in any order, and/or may be performed in parallel, without departing from the scope of the inventive subject matter. In addition, it is to be understood that information within the various different messages, which are described above as being exchanged between the system elements, may be combined together into single messages, and/or the information within a particular message may be separated into multiple messages. Further, messages may be sent by system elements in sequences that are different from the sequences described above. Furthermore, words such as "connected" or "coupled to" used in describing a relationship between different elements do not imply that a direct physical connection must be made between these elements. For example, two elements may be connected to each other physically, electronically, logically, or in any other manner, through one or more additional elements, without departing from the scope of the inventive subject matter.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled technicians may implement the described functionality in varying ways for each particular application, but such implementation decisions should not be interpreted as causing a departure from the scope of the inventive subject matter.

The various illustrative logical blocks and modules described in connection with the embodiments disclosed herein may be implemented or performed with various types of computational apparatus, including but not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in one or more software modules executed by a processor, or in a combination of the two. A software module may reside in random access memory, flash memory, read only memory (ROM), erasable programmable ROM (EPROM), electrical EPROM, registers, hard disk, a removable disk, a compact disc ROM (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

An embodiment of a method for wirelessly communicating a signal includes the steps of combining a plurality of phase shifted input data signals with a plurality of synchronization/pilot sequences to produce a plurality of combined signals, performing frequency domain-to-time domain transformations of the combined signals to produce a plurality of candidate signals, determining peak-to-average ratios for at least some of the plurality of candidate signals, identifying a selected signal from the plurality of candidate signals based on the peak-to-average ratios, and transmitting the selected signal over a wireless communication channel.

In a further embodiment, identifying the selected signal includes the step of identifying the selected signal as a signal of the plurality of candidate signals that has a lowest peak-to-average ratio of the peak-to-average ratios. A further embodiment includes the steps of receiving an input data symbol, applying a first scaling factor to the input data symbol to produce a scaled input data symbol, phase shifting the scaled input data symbol to produce the plurality of phase shifted input data signals, and prior to combining, applying a second scaling factor to the plurality of synchronization/pilot sequences. In a further embodiment, applying the first scaling factor includes applying a scaling factor having a value of $\sqrt{1-\rho}$, and applying the second scaling factor includes applying a scaling factor having a value of $\sqrt{\rho}$, where $\rho$ is an embedding factor having a value between 0 and 1. In a further embodiment, $\rho$ is an embedding factor having a value in a range between about 0.25 and about 0.35. A further embodiment includes the step of obtaining the plurality of synchronization/pilot sequences from a set of pre-generated synchronization/pilot sequences, where each synchronization/pilot sequence of the plurality of synchronization/pilot sequences is identified by a selective mapping (SLM) index. A further embodiment includes the steps of receiving a received signal from the wireless communication channel, where the received signal represents a channel-affected version of the selected signal, performing blind phase sequence detection in order to determine an estimate of a SLM index that identifies a synchronization/pilot sequence embedded within the selected signal, determining estimated channel perturbations within the received signal based on the received signal and the estimate of the SLM index, applying corrections to the received signal, based on the estimated channel perturbations, to produce a corrected received signal, and producing an output data symbol from the corrected received signal. In a further embodiment, transmitting the selected signal includes the step of transmitting the selected signal without a preamble.

Another embodiment of a method includes the steps of receiving a received signal from a wireless communication channel, where the received signal represents a channel-affected version of a selected signal that was transmitted by a transmitter, and where the selected signal represents a signal selected by the transmitter from a plurality of candidate signals, and where the received signal includes a combination of a phase shifted input data signal with a synchronization/pilot sequence. The method also includes determining an estimate of a selective mapping (SLM) index, which identifies the synchronization/pilot sequence from a plurality of synchronization/pilot sequences, applying corrections to the received signal based on estimated channel perturbations within the received signal, which estimated channel perturbations are determined based on the estimate of the SLM index, to produce an equalized combined signal, and producing an output data symbol from the equalized combined signal.

In a further embodiment, determining the estimate of the SLM index includes performing blind phase sequence detection in order to determine the estimate of the SLM index. In a further embodiment, determining the estimate of the SLM index includes correlating the received signal with a plurality of synchronization/pilot sequences to produce a plurality of conjugate correlation outputs, and determining the estimate of the SLM index as an SLM index corresponding to the conjugate correlation output having a highest correlation peak. In a further embodiment, correlating the received signal includes dividing the received signal into a plurality of subcode sequences, generating a sub-correlation for each subcode sequence of the plurality of subcode sequences, and summing together the sub-correlation for each subcode sequence to form a conjugate correlation output as a summed result having a single correlation peak. In a further embodiment, applying the corrections includes the steps of determining a coarse timing offset based on the maximum of the conjugate correlation output having the highest correlation peak, determining a coarse carrier frequency offset from a phase of the conjugate correlation output having the highest correlation peak, producing a coarsely-corrected signal by aligning the received signal on a symbol boundary using the coarse timing offset and the coarse frequency offset, producing a finely-corrected signal from the coarsely-corrected signal and a fine carrier frequency offset determined from the coarsely-corrected signal, determining a channel estimate based on a frequency-domain version of the finely-corrected signal, and equalizing channel effects in the frequency-domain version of the finely-corrected signal based on the channel estimate to produce the equalized combined signal. In a further embodiment, producing the finely-corrected signal includes the steps of performing a time domain-to-frequency domain transformation of the coarsely-corrected signal to produce a frequency domain signal, determining the fine carrier frequency offset using pilot signals within the frequency domain signal, performing a frequency domain-to-time domain transformation of the fine carrier frequency offset to produce a time-domain version of the fine carrier frequency offset, producing a time-domain version of the finely-corrected signal from the coarsely-corrected signal and the time-domain version of the fine carrier frequency offset, and performing a time domain-to-frequency domain transformation of the time-domain version of the finely-corrected signal to produce the finely-corrected signal. In a further embodiment, producing the finely-corrected signal includes the steps of performing a time domain-to-frequency domain transformation of the coarsely-corrected signal to produce a frequency domain signal, determining the fine carrier frequency offset using pilot signals within the frequency domain signal, and correcting for the fine carrier frequency offset in the frequency domain to produce the finely-corrected signal. In a further embodiment, producing the finely-corrected signal includes producing the finely-corrected signal from the coarsely-corrected signal, the fine carrier frequency offset, and a fine timing offset determined from the coarsely-corrected signal. In a further embodiment, applying the corrections includes determining one or more estimated channel perturbations selected from a group that includes a timing offset, a carrier frequency offset, and multi-path fading. In a further embodiment, producing the output data includes removing the synchronization/pilot sequence from the equalized combined signal to produce an estimated, phase shifted data signal, scaling the estimated, phase shifted data signal to produce a scaled, phase shifted data signal, and phase shifting and demodulating the scaled, phase shifted data signal to produce the output data symbol.

An embodiment of a system includes a transmitter and a receiver. The transmitter is adapted to combine a plurality of phase shifted input data signals with a plurality of synchronization/pilot sequences to produce a plurality of combined signals, to perform frequency domain-to-time domain transformations of the combined signals to produce a plurality of candidate signals, to determine peak-to-average ratios for at least some of the plurality of candidate signals, to identify a selected signal from the plurality of candidate signals based on the peak-to-average ratios, and to transmit the selected signal over a wireless communication channel. The receiver is adapted to receive a received signal from the wireless communication channel, where the received signal represents a channel-affected version of the selected signal, to perform blind phase sequence detection in order to determine an estimate of a SLM index that identifies a synchronization/pilot sequence embedded within the selected signal, to determine estimated channel perturbations within the received signal based on the received signal and the estimate of the SLM index, to apply corrections to the received signal, based on the estimated channel perturbations, to produce an equalized combined signal, and to produce an output data symbol from the equalized combined signal.

In a further embodiment, the transmitter and the receiver are included within wireless communication devices selected from a group that includes a cellular telephone, a radio, an unmanned autonomous vehicle, a one-way pager, a two-way pager, a personal data assistant, a computer, a base station, a wireless transmitter, and a wireless transceiver.

An embodiment of a transmitter includes a plurality of combiners adapted to combine a plurality of phase shifted input data signals with a plurality of synchronization/pilot sequences to produce a plurality of combined signals, a frequency domain-to-time domain transformer, adapted to perform frequency domain-to-time domain transformations of the combined signals to produce a plurality of candidate signals, a signal selector adapted to determine peak-to-average ratios for at least some of the plurality of candidate signals, and to identify a selected signal from the plurality of candidate signals based on the peak-to-average ratios, and an antenna adapted to transmit the selected signal over a wireless communication channel.

A further embodiment includes a first combiner adapted to apply a first scaling factor to the input data symbol to produce a scaled input data symbol, and a plurality of second combiners adapted to apply a second scaling factor to the plurality of synchronization/pilot sequences, where the first scaling factor and the second scaling factor have an inverse relationship. A further embodiment includes a plurality of phase shifters adapted to phase shift the input data symbol to produce the plurality of phase shifted input data signals.

An embodiment of a receiver includes a plurality of correlators, a peak detector, an offset estimator/corrector, a channel estimator/corrector, a combiner, a scaling element, and a phase shifter. The plurality of correlators is adapted to receive a received signal from a wireless communication channel, where the received signal represents a channel-affected version of a selected signal that was transmitted by a transmitter, and where the selected signal represents a signal selected by the transmitter from a plurality of candidate signals, and where the received signal includes a combination of a phase shifted input data signal with a synchronization/pilot sequence. The peak detector is adapted to determine an estimate of a selective mapping (SLM) index, which identifies the synchronization/pilot sequence from a plurality of synchronization/pilot sequences. The offset estimator/corrector is adapted to determine, based on the received signal and the estimate of the SLM index, a coarse timing offset estimate, a coarse carrier frequency offset estimate, and a fine carrier frequency offset estimate, and to correct the received signal using the coarse timing offset estimate, a coarse carrier frequency offset estimate, and a fine carrier frequency offset estimate to produce a finely-corrected signal. The channel estimator/corrector is adapted to determine a channel estimate based on a frequency-domain version of the finely-corrected signal, and to equalize channel effects in the frequency-domain version of the finely-corrected signal based on the channel estimate to produce an equalized combined signal. The combiner is adapted to remove the synchronization/pilot sequence from the equalized combined signal to produce an estimated, phase shifted data signal. The scaling element is adapted to scale the estimated, phase shifted data signal to produce a scaled, phase shifted data signal, and the phase shifter and demodulator are adapted to phase shift and demodulate the scaled, phase shifted data signal to produce the output data symbol.

While various exemplary embodiments have been presented in the foregoing detailed description, it should be appreciated that a vast number of variations exist. It should also be appreciated that the exemplary embodiments are only examples, and are not intended to limit the scope, applicability or configuration of the inventive subject matter in any way. Rather, the foregoing detailed description will provide those skilled in the art with a convenient road map for implementing various embodiments of the inventive subject matter, it being understood that various changes may be made in the function and arrangement of elements described in an exemplary embodiment without departing from the scope of the inventive subject matter as set forth in the appended claims and their legal equivalents.

What is claimed is:

1. A method for wirelessly communicating a signal, the method performed by a transmitter of a wireless communication device and comprising the steps of:
    combining a plurality of phase shifted input data signals with a plurality of synchronization/pilot sequences to produce a plurality of combined signals;
    performing frequency domain-to-time domain transformations of the combined signals to produce a plurality of candidate signals;
    determining peak-to-average ratios for at least some of the plurality of candidate signals;
    identifying a selected signal from the plurality of candidate signals based on the peak-to-average ratios; and
    transmitting the selected signal over a wireless communication channel.

2. The method of claim 1, wherein identifying the selected signal comprises the step of:

identifying the selected signal as a signal of the plurality of candidate signals that has a lowest peak-to-average ratio of the peak-to-average ratios.

3. The method of claim 1, further comprising:
obtaining the plurality of synchronization/pilot sequences from a set of pre-generated synchronization/pilot sequences, wherein each synchronization/pilot sequence of the plurality of synchronization/pilot sequences is identified by a selective mapping (SLM) index.

4. The method of claim 1, further comprising the steps of:
receiving a received signal from the wireless communication channel, wherein the received signal represents a channel-affected version of the selected signal;
performing blind phase sequence detection in order to determine an estimate of a SLM index that identifies a synchronization/pilot sequence embedded within the selected signal;
determining estimated channel perturbations within the received signal based on the received signal and the estimate of the SLM index;
applying corrections to the received signal, based on the estimated channel perturbations, to produce a corrected received signal; and
producing an output data symbol from the corrected received signal.

5. The method of claim 1, wherein transmitting the selected signal comprises the step of:
transmitting the selected signal without a preamble.

6. A method for wirelessly communicating a signal, the method comprising the steps of:
receiving an input data symbol;
applying a first scaling factor to the input data symbol to produce a scaled input data symbol;
phase shifting the scaled input data symbol to produce a plurality of phase shifted input data signals;
applying a second scaling factor to a plurality of synchronization/pilot sequences to produce a plurality of scaled synchronization/pilot sequences;
combining the plurality of phase shifted input data signals with the plurality of scaled synchronization/pilot sequences to produce a plurality of combined signals;
performing frequency domain-to-time domain transformations of the combined signals to produce a plurality of candidate signals;
determining peak-to-average ratios for at least some of the plurality of candidate signals;
identifying a selected signal from the plurality of candidate signals based on the peak-to-average ratios; and
transmitting the selected signal over a wireless communication channel.

7. The method of claim 6, wherein applying the first scaling factor comprises applying a scaling factor having a value of $\sqrt{1-\rho}$, and wherein applying the second scaling factor comprises applying a scaling factor having a value of $\sqrt{\rho}$, wherein $\rho$ is an embedding factor having a value between 0 and 1.

8. The method of claim 7, wherein $\rho$ is an embedding factor having a value in a range between about 0.25 and about 0.35.

9. A transmitter comprising:
a plurality of combiners adapted to combine a plurality of phase shifted input data signals with a plurality of synchronization/pilot sequences to produce a plurality of combined signals;
a frequency domain-to-time domain transformer, adapted to perform frequency domain-to-time domain transformations of the combined signals to produce a plurality of candidate signals;
a signal selector adapted to determine peak-to-average ratios for at least some of the plurality of candidate signals, and to identify a selected signal from the plurality of candidate signals based on the peak-to-average ratios; and
an antenna adapted to transmit the selected signal over a wireless communication channel.

10. The transmitter of claim 9, further comprising:
a plurality of phase shifters adapted to phase shift the input data symbol to produce the plurality of phase shifted input data signals.

11. A transmitter comprising:
a plurality of combiners adapted to combine a plurality of phase shifted input data signals with a plurality of synchronization/pilot sequences to produce a plurality of combined signals;
a frequency domain-to-time domain transformer, adapted to perform frequency domain-to-time domain transformations of the combined signals to produce a plurality of candidate signals;
a signal selector adapted to determine peak-to-average ratios for at least some of the plurality of candidate signals, and to identify a selected signal from the plurality of candidate signals based on the peak-to-average ratios;
an antenna adapted to transmit the selected signal over a wireless communication channel;
a first combiner adapted to apply a first scaling factor to the input data symbol to produce a scaled input data symbol; and
a plurality of second combiners adapted to apply a second scaling factor to the plurality of synchronization/pilot sequences, wherein the first scaling factor and the second scaling factor have an inverse relationship.

* * * * *